United States Patent [19]

Schrott et al.

[11] Patent Number: 5,084,592

[45] Date of Patent: Jan. 28, 1992

[54] AZULENESQUARIC ACID DYES, AZULENE INTERMEDIATES THEREFOR, AND OPTICAL RECORDING MEDIUM

[75] Inventors: Wolfgang Schrott, Ludwigshafen; Peter Neumann, Wiesloch; Sibylle Brosius, Mannheim; Helmut Barzynski, Duerkheim; Klaus D. Schomann, Ludwigshafen; Harald Kuppelmaier, Heidelberg, all of Fed. Rep. of Germany

[73] Assignee: Basf Aktiengesellschaft, Ludwigshafen, Fed. Rep. of Germany

[21] Appl. No.: 251,465

[22] Filed: Sep. 30, 1988

[30] Foreign Application Priority Data

Oct. 1, 1987 [DE] Fed. Rep. of Germany ....... 3733173
May 11, 1988 [DE] Fed. Rep. of Germany ....... 3816187

[51] Int. Cl.$^5$ .............. G11B 7/24; C07C 49/613; C07C 67/26; C09B 57/00
[52] U.S. Cl. .............. 558/162; 560/42; 560/45; 560/53; 560/116; 560/119; 562/433; 562/452; 562/454; 562/456; 562/457; 562/458; 562/462; 562/466; 562/498; 562/501; 564/163; 564/164; 564/169; 564/188; 564/428; 564/452; 564/454; 564/453; 564/456; 564/460; 568/327; 568/374; 430/70
[58] Field of Search .............. 558/155, 162; 560/107, 560/127, 42, 45, 53, 116; 562/452, 433, 454, 456, 457, 458, 462, 466, 498; 564/163, 164, 165, 167, 169, 188, 428, 452; 568/327, 374

[56] References Cited

U.S. PATENT DOCUMENTS 4,675,423  6/1987  Schrott et al. ............... 556/136

FOREIGN PATENT DOCUMENTS 187015  7/1986  European Pat. Off. .
196919  10/1986  European Pat. Off. .
310080  4/1989  European Pat. Off. .
2124616  2/1984  United Kingdom .

OTHER PUBLICATIONS

Neidlein, et al., Helvetica Chimica Acta, vol. 65, Fasc. 1, 1982, pp. 280–285.
Ziegerbein et al, "Angewandt–Chemie"; vol. 78 (1966), p. 937.
Kim, et al., Dyes and Pigments, vol. 8, 1987, pp. 381–388.
Hafner, et al., Liebigs Annalen Der Chemie, vol. 650, 1961, pp. 80–93.

Primary Examiner—Mark L. Berch
Attorney, Agent, or Firm—Oblon, Spivak, McClelland, Maier & Neustadt

[57] ABSTRACT

Azulenesquaric acid dyes of the formula

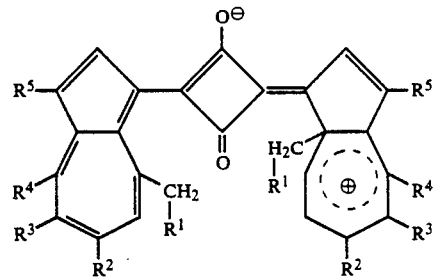

where $R^1$, $R^2$, $R^3$, $R^4$ and $R^5$ each have specified meanings are prepared from azulene derivatives of the formula

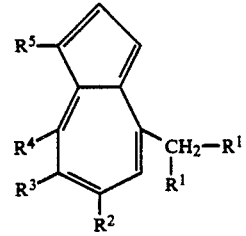

where $R^1$, $R^2$, $R^3$, $R^4$ and $R^5$ each have specified meanings as intermediates, and used in an optical recording medium.

4 Claims, No Drawings

AZULENESQUARIC ACID DYES, AZULENE INTERMEDIATES THEREFOR, AND OPTICAL RECORDING MEDIUM

The present invention relates to novel azulenesquaric acid dyes having a particular substitution pattern, novel azulenes as intermediates therefor, and a novel optical recording medium containing the novel azulenesquaric acid dyes.

Economical manufacture of optical data recording media requires dyes having particular properties. These dyes should have a strong absorption between 700 and 900 nm in order to provide layers writable with semiconductor lasers, a high reflectivity in the layer in the near infrared (700–900 nm) in order to require only a simple layer structure (without reflector layer), high solubility, for example in order to be able to apply the thin storage layer to a base material by spincoating, and a high stability in thin layers.

All prior art storage materials have appreciable defects in at least one of the requirements mentioned.

It is an object of the present invention to provide new dyes where the abovementioned defects do not occur at all or at most only to an extremely small extent.

We have found that this object is achieved with a novel azulenesquaric acid dye of the formula I

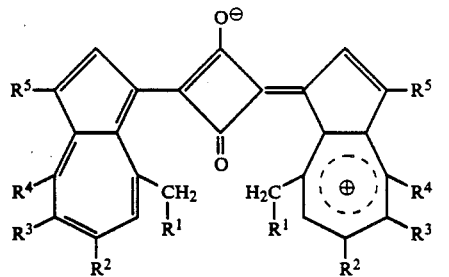

where $R^1$ is $C_1$–$C_{12}$-alkyl, which may be substituted by halogen, amino, hydroxyl, $C_1$–$C_{12}$-alkoxy, phenyl, substituted phenyl, carboxyl, $C_1$–$C_{12}$-alkoxycarbonyl, $C_1$–$C_{12}$-haloalkoxycarbonyl, $C_1$–$C_{12}$-phenylalkoxycarbonyl, cyano, $C_1$–$C_{12}$-alkanoyloxy, benzoyloxy, substituted benzoyloxy and/or by the radical

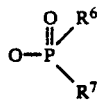

where $R^6$ and $R^7$ are identical or different and each is $C_1$–$C_4$-alkyl or phenyl independently of the other, carboxyl, $C_1$–$C_{12}$-alkoxycarbonyl, where the alkyl chain may be interrupted by one or more oxygen atoms, carbamoyl or $C_1$–$C_4$-monoalkyl- or -dialkylcarbamoyl and $R^2$, $R^3$, $R^4$ and $R^5$ are identical or different and each is hydrogen or $C_1$–$C_{12}$-alkyl, which may be substituted by halogen, amino, $C_1$–$C_{12}$-alkoxy, phenyl, substituted phenyl, carboxyl, $C_1$–$C_{12}$-alkoxycarbonyl or cyano, independently of the others, with the proviso that, when $R^5$ is hydrogen, the positions of substituents $CH_2$-$R^1$ and $R^4$ on either or both azulene rings may also be interchanged within an azulene ring and that $R^1$ is also hydrogen when $R^5$ is methyl or ethyl which may each be substituted by phenyl or substituted phenyl, or is $C_3$–$C_{12}$-alkyl or when at least one of the two radicals $R^2$ and $R^4$ is phenyl or substituted phenyl.

All the alkyl groups appearing in the compounds according to the invention may be not only straight-chain but also branched.

If substituted phenyl groups appear in the compounds according to the invention, suitable substituents are for example $C_1$–$C_4$-alkyl, $C_1$–$C_4$-alkoxy, $C_1$–$C_4$-dialkylamino, N-phenyl-N-($C_1$–$C_4$-alkyl)amino or halogen.

If alkyl groups interrupted by oxygen atoms appear in the compounds according to the invention, preference is given to those alkyl groups which are interrupted by from 1 to 3 oxygen atoms.

Halogen is in each case preferably fluorine, chlorine, or bromine.

The radicals $R^1$, $R^2$, $R^3$, $R^4$ and $R^5$ in the formula I are for example, methyl, ethyl, propyl, isopropyl, butyl, isobutyl, sec-butyl, tert-butyl, pentyl, isopentyl, neopentyl, tert-pentyl, 2-methylbutyl, hexyl, 2-methylpentyl, isohexyl, heptyl, octyl, 2-ethylhexyl, nonyl, decyl, undecyl, dodecyl, fluoromethyl, chloromethyl, difluoromethyl, trifluoromethyl, trichloromethyl, 2-fluoroethyl, 2-chloroethyl, 2-bromoethyl, 1,1,1-trifluoroethyl, heptafluoropropyl, 4-chlorobutyl, 5-fluoropentyl, 6-chlorohexyl, cyanomethyl, 2-cyanoethyl, 3-cyanopropyl, 2-cyanobutyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl, 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2-methoxypropyl, 2-ethoxypropyl, 3-ethoxypropyl, 4-ethoxybutyl, 4-isopropoxybutyl, 5-ethoxypentyl, 6-methoxyhexyl, benzyl, 1-phenylethyl, 2-phenylethyl, 4-chlorobenzyl, 4-methoxybenzyl, 2-(4-methylphenyl)ethyl, carboxymethyl, 2-carboxyethyl, 3-carboxypropyl, 4-carboxybutyl, 5-carboxypentyl, 6-carboxyhexyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonylpentyl, 5-ethoxycarbonylpentyl, 6-methoxycarbonylhexyl or 6-ethoxycarbonylhexyl.

$R^2$ and $R^4$ are each also for example 4-methylphenyl, 4-methoxyphenyl or 4-chlorophenyl.

$R^1$ in the formula I is also for example methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, neopentyloxycarbonyl, tert-pentyloxycarbonyl, hexyloxycarbonyl, isohexyloxycarbonyl, heptyloxycarbonyl, octyloxycarbonyl, isooctyloxycarbonyl, nonyloxycarbonyl, isononyloxycarbonyl, decyloxycarbonyl, isodecyloxycarbonyl, undecyloxycarbonyl, dodecyloxycarbonyl (the designations isooctyl, isononyl and isodecyl are trivial names derived from oxosynthesis alcohols; cf. Ullmann's Encyklopädie der Technischen Chemie, 4th Edition, Volume 7, pages 215 to 217, and also Volume 11, pages 435 and 436), 2-methoxyethoxycarbonyl, 2-ethoxyethoxycarbonyl, 3,6-dioxaheptyloxycarbonyl, 1-methoxycarbonylethyl, 1-ethoxycarbonylethyl, 1-propoxycarbonylethyl, 1-isopropoxycarbonylethyl, 1-butoxycarbonylethyl, 1-isobutoxycarbonylethyl, 1-sec-butoxycarbonylethyl, 1-methoxycarbonylpropyl, 1-ethoxycarbonylpropyl, 1-propoxycarbonylpropyl, 1-isopropoxycarbonylpropyl, 1-butoxycarbonylpropyl, 1-isobutoxycarbonylpropyl, 1-sec-butoxycarbonylpropyl, α-(methoxycarbonyl)benzyl, α-(ethoxycarbonyl)benzyl, acetyloxymethyl, 2-acetyloxyethyl, 2-(2,2-dimethylpropionyloxy)ethyl, 2-decanoyloxyethyl, benzoyloxymethyl, 2-benzyloxyethyl, 2-(3,5-dimethoxy-4-methylbenzoyloxy)ethyl, 2-(dimethylphosphinato)ethyl, 2-(diethylphosphinato)ethyl, 2-(methyl-ethylphosphinato)ethyl, 3-ethyl-2-(methyl-ethylphosphinato)propyl or 2-(diphenylphosphinato)ethyl.

Preference is given to azulenesquaric acid dyes of the formula I where $R^2$, $R^3$, $R^4$ and $R^5$ are each $C_1$–$C_6$ alkyl and $R^1$ is as defined above.

Particular preference is given to azulenesquaric acid dyes of the formula I where $R^2$ and $R^4$ are each methyl, $R^3$ and $R^5$ are each hydrogen, and $R^1$ is as defined above. These dyes conform to the formula Ia

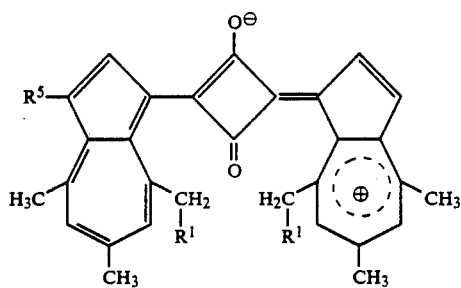

Very particular preference is given to azulenesquaric dyes of the formula I where $R^2$ and $R^4$ are each hydrogen, $R^3$ is isopropyl, $R^5$ is methyl and $R^1$ is as defined above. These dyes conform to the formula Ib

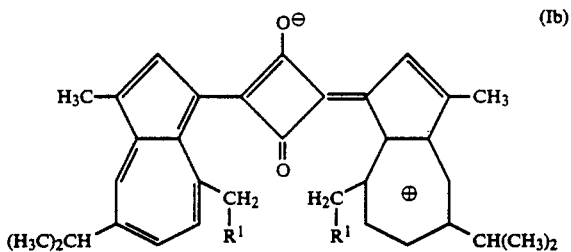

Preference is further given to azulenesquaric acid dyes of the formula I where $R^1$ is $C_1$–$C_{12}$-alkyl which is substituted by $C_1$–$C_{12}$-alkoxycarbonyl. Particularly noteworthy are those azulenesquaric acid dyes of the formula I where $R^1$ is $C_1$–$C_{12}$-alkoxycarbonylmethyl.

The dyes of the formula I are obtained from azulene derivatives of the formula II, where $R^1$, $R^2$, $R^3$, $R^4$ and $R^5$ are each as defined above, by reaction with squaric acid of the formula III in accordance with the following equation:

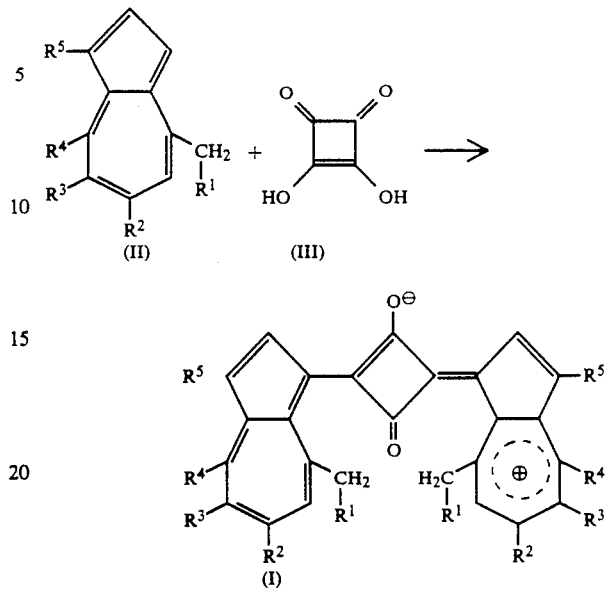

In the case of those azulene derivatives of the formula II where $R^5$ is hydrogen, the link to the squaric acid can form at different ring positions on the five-membered ring and give rise to isomeric products where, as stated above, the ring positions of the substituents $CH_2$-$R^1$ and $R^4$ are interchanged. This is because compounds where the bond to the squaric acid is formed on that side where the substituent $CH_2$-$R^1$ is bonded must then be distinguished from those compounds where the bond to the squaric acid is formed on that side where the substituent $R^4$ is bonded. These isomeric compounds can be separated chromatographically. For application in storage layers, however, it is customary to use the isomeric mixtures.

The method of preparation is known per se and described for example in Angew. Chem. 78 (1966), 937.

In the reaction of squaric acid with azulene derivatives of the formula II where $R^1$ is $C_1$–$C_{12}$-alkyl which is substituted by hydroxyl, in particular in the case of the corresponding $C_2$–$C_3$-hydroxyalkyl derivatives, it has been found that increasingly a cyclized 1:1 adduct of azulene derivative and squaric acid forms as a byproduct.

The present invention further relates to a novel azulene derivative of the formula II

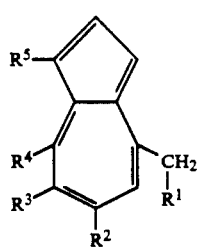

where
$R^1$ is $C_2$–$C_{12}$-alkyl, which may be substituted by halogen, amino, hydroxyl, $C_1$–$C_{12}$-alkoxy, phenyl, substituted phenyl, $C_1$–$C_{12}$-alkoxycarbonyl, $C_1$–$C_{12}$-haloalkoxycarbonyl, $C_1$–$C_{12}$-phenylalkoxycarbonyl, cyano, C$_1$-C$_{12}$-alkanoyloxy, benzoyloxy, substituted benzoyloxy and/or by the radical

where R$^6$ and R$^7$ are identical or different and each is C$_1$-C$_4$-alkyl or phenyl independently of the other, carboxyl, C$_1$-C$_{12}$-alkoxycarbonyl, where the alkyl chain may be interrupted by one or more oxygen atoms, carbamoyl or C$_1$-C$_4$-monoalkyl- and -dialkylcarbamoyl and R$^2$, R$^3$, R$^4$ and R$^5$ are identical or different and each is hydrogen or C$_1$-C$_{12}$-alkyl which may be substituted by halogen, amino, C$_1$-C$_{12}$-alkoxy, phenyl, substituted phenyl, carboxyl, C$_1$-C$_{12}$-alkoxycarbonyl or cyano, independently of the others, with the proviso that R$^1$ is also hydrogen when R$^5$ is methyl or ethyl which are each substituted by phenyl or substituted phenyl, or C$_3$-C$_{12}$-alkyl, or when at least one of the two radicals R$^2$ and R$^4$ is phenyl or substituted phenyl.

Concerning a list of examples of the substituents R$^1$, R$^2$, R$^3$, R$^4$ and R$^5$, reference is made to the preceding observations.

Particular preference is given to azulene derivatives of the formula II where R$^2$ and R$^4$ are each methyl, R$^3$ and R$^5$ are each hydrogen and R$^1$ is as defined above.

Very particular preference is given to azulene derivatives of the formula II where R$^2$ and R$^4$ are each hydrogen, R$^3$ is isopropyl, R$^5$ is methyl and R$^1$ is as defined above.

Preference is further given to azulene derivatives of the formula II where R$^1$ is C$_2$-C$_{12}$-alkyl which is substituted by C$_1$-C$_{12}$-alkoxycarbonyl.

The novel azulene derivatives of the formula II are useful intermediates for preparing the azulenesquaric acid dyes of the formula I according to the invention.

They are obtained for example from substituted methylazulenes, for example 4,6,8-trimethylazulene or guaiazulene, by anionization, for example with lithium diisopropylamide, and subsequent alkylation with halogen compounds of the formula IV R$^1$-Hal (IV), where R$^1$ is as defined above and Hal is halogen, in particular chlorine, bromine or iodine.

It is also possible, starting from the corresponding azulenecarboxylic acids, to obtain further products according to the invention. For instance, those azulene derivatives of the formulae IIa and IIb

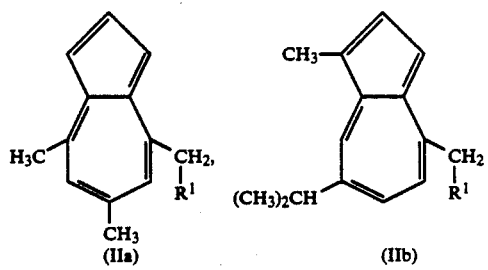

where R$^1$ is in each case C$_2$-C$_{12}$-alkyl which is substitued by carboxyl are particularly suitable for further derivatization. They can be derivatized for example in a conventional manner to obtain the respective esters, nitriles or hydroxy compounds. A method of preparing azulenecarboxylic acids is described for example in Helv. Chim. Acta. 65 (1982), 280-85.

Starting from the hydroxy compounds it is then possible to obtain, again in a conventional manner, those compounds of the formula II where R$^1$ is C$_1$-C$_{12}$-alkyl which is substituted by alkoxy, alkanoyloxy or benzoyloxy or the radical

where R$^6$ and R$^7$ are each as defined above.

This takes the form for example of reacting a hydroxy compound of the formula VI

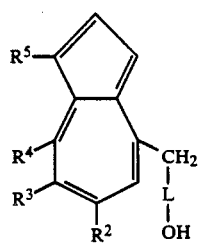

(VI)

where R$^2$, R$^3$, R$^4$ and R$^5$ are each as defined above and L is C$_1$-C$_{12}$-alkylene, with alkylating agents (for example dimethyl sulfate), carbonyl chlorides or phosphinoyl chlorides in the presence of a base (for example triethylamine).

The compound of the formula V

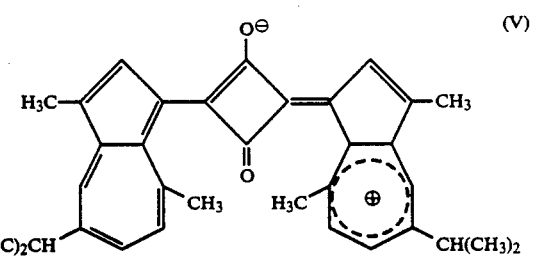

(V)

which is prepared from guaiazulene and squaric acid, is known and described for example in Angew. Chem. 78 (1966) 937. The use thereof in optical storage media is likewise known, for example from DE-A-3,320,674 and the earlier application DE-A-3,703,985.

It is true that compound V shows good optical data, so that thin dye layers produced therefrom are suitable for optical information recording without a reflector layer, but to prepare spincoating formulations it is only sufficiently soluble in halogenated hydrocarbons. In order that storage layers may be spincoated onto grooved polycarbonate substrates, a protective layer is therefore required against these aggressive solvents. In addition, compound V tends to recrystallize in thin layers, so that the formulation must frequently be given a binder content of up to 30 percent in order to suppress recrystallization.

It is a further object of the present invention to provide a new optical recording medium containing azulenesquaric acid derivatives as storage materials which is simply manufacturable, which is readily writable and subsequently readily readable as well, to which end the signal-to-noise ratio should be as high as possible, and in which the storage layers are of high stability.

We have found that this object is achieved with an optical recording medium containing a base material and a radiation-sensitive thin coating film which contains a dye with or without a binder, the dye having the formula I

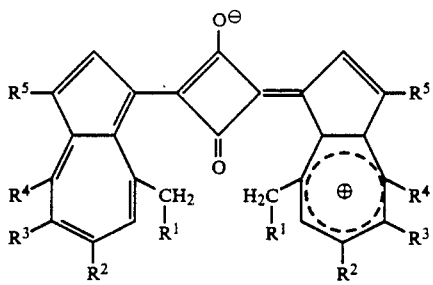 (I)

where

R$^1$ is C$_1$–C$_{12}$-alkyl, which may be substituted by halogen, amino, hydroxy C$_1$–C$_{12}$-alkoxy, phenyl, substituted phenyl, carboxyl, C$_1$–C$_{12}$-alkoxycarbonyl, C$_1$–C$_{12}$-haloalkoxycarbonyl, C$_1$–C$_{12}$-phenylalkoxycarbonyl, cyano, C$_1$–C$_{12}$-alkanoyloxy, benzoyloxy, substituted benzoyloxy and/or by the radical

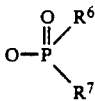

where R$^6$ and R$^7$ are identical or different and each is C$_1$–C$_4$-alkyl or phenyl independently of the other, carboxyl, C$_1$–C$_{12}$-alkoxycarbonyl, where the alkyl chain may be interrupted by one or more oxygen atoms, carbamoyl or C$_1$–C$_4$-monoalkyl- or -dialkylcarbamoyl and R$^2$, R$^3$, R$^4$ and R$^5$ are identical or different and each is hydrogen or C$_1$–C$_{12}$-alkyl, which may be substituted by halogen, amino, C$_1$–C$_{12}$-alkoxy, phenyl, substituted phenyl, carboxyl, C$_1$–C$_{12}$-alkoxycarbonyl or cyano, independently of the others, with the proviso that, when R$^5$ is hydrogen, the positions of substituents CH$_2$-R$^1$ and R$^4$ on either or both azulene rings may also be interchanged for one another within an azulene ring and that R$^1$ is also hydrogen when R$^5$ is methyl or ethyl which may each be substituted by phenyl or substituted phenyl, or is C$_3$–C$_{12}$-alkyl or when at least one of the two radicals R$^2$ and R$^4$ is phenyl or substituted phenyl.

Preference is given to an optical recording medium which contains azulenesquaric acid dyes of the formula I where R$^2$, R$^3$, R$^4$ and R$^5$ are each C$_1$–C$_6$-alkyl and R$^1$ is as defined above.

Particular preference is given to an optical recording medium which contains azulenesquaric acid dyes of the formula I where R$^2$ and R$^4$ are each methyl, R$^3$ and R$^5$ are each hydrogen and R$^1$ is as defined above.

Very particular preference is given to an optical recording medium which contains azulenesquaric acid dyes of the formula I where R$^2$ and R$^4$ are each hydrogen, R$^3$ is isopropyl, R$^5$ is methyl and R$^1$ is as defined above.

Suitable base materials are conveniently transparent base materials, such as glass or plastics. Suitable plastics are for example poly(meth)acrylates, polycarbonates, polyesters, epoxies, polyolefins (for example polymethylpentene), polyamide, polyvinyl chloride, polystyrene or polyvinyl esters.

A preferred recording medium has a base material made of polycarbonate or poly(meth)acrylates, but in particular polycarbonate.

Preference is further given to an optical recording medium which contains from 1 to 30% by weight, based on the dye, of a binder.

The novel azulenesquaric acid dyes of the formula I, in particular those where R$^1$ is C$_1$–C$_{12}$-alkyl which is substituted by C$_1$–C$_{12}$-alkoxycarbonyl, show the same good optical properties as the known basic structure V. Furthermore, with the novel compounds the pure dye layers are more stable. This is because to date the pure dye layer has not been found to recrystallize and thus does not need the addition of a polymeric binder. Moreover, the light fastness (stability) is also distinctly higher than that of existing methine dyes, so that the addition of stabilizers to the layer formulation can be kept to a minimum. Of particular advantage is also the good solubility of the novel dyes I in most organic solvents, so that these dyes can be spincoated directly (without protective layer) onto structured plastics substrates, in particular polycarbonate substrates.

As stated above, the spincoating solution preferably contains a binder in order to confer good longterm stability on the recording medium and in particular to optimize the viscosity of the spincoating solution. Preferably this solution contains from 1 to 30% by weight, based on the solids content of the spincoating solution, of a binder. Suitable binders are for example polyorganosiloxanes, epoxies, poly(meth)acrylates, polystyrene homopolymers and copolymers, polyvinylcarbazole, polyvinylpyrrolidone, polyimidazole copolymers, polyvinyl ester copolymers, polyvinyl ether copolymers, polyvinylidene chloride copolymers, acrylonitrile copolymers, polyvinyl chloride or copolymers thereof, cellulose acetate or nitrocellulose.

A preferred recording medium has a binder based on a vinylpyrrolidone/vinylacetate copolymer or a polyvinyl chloride/polyvinyl ether copolymer.

The optical recording medium according to the invention is advantageously produced by applying a solution containing organic binder, azulenesquaric acid dye I and, if it is to be used, a binder by spincoating. Advantageously, the spincoating solution has a solids content of from 1 to 30% by weight, based on the solution.

Suitable solvents are for example propanol, isopropanol, butanol, diacetone alcohol, methyl ethyl ketone, toluene, bromoform, 1,1,2-trichloroethane and mixtures thereof.

If desired, the solution may additionally contain up to 10% by weight, based on the solids content of the spincoating solution, of additives, for example antioxidants, singlet oxygen quenchers or UV-absorbers.

Preferably, the spincoating solution contains up to 5% by weight, based on the solids content of the spincoating solution, of a mixture of a plurality of antioxidants, singlet oxygen quenchers and UV-absorbers. On employing antioxidants which likewise absorb in the near infrared, for example nickel dithiolene complexes, as described for example in DE-A-3,505,750, DE-A-3,505,751 or S. H. Kim, M. Matsuoka, M. Yomoto, Y. Tsuchiya and T. Kitao, Dyes and Pigments, 8 (1987), 381–388, preferably up to 10% by weight, based on the solids content of the spincoating solution, may be present in the solution.

For the purposes of the present invention, spincoating comprises applying the solution to the rotating base, which conveniently has a round shape. However, it is also possible to apply the solution to the initially stationary base and then to set the base material in rotation. The application of the solution to the base is conveniently effected with a syringe or capillary or by means of a mechanical pump.

The base generally rotates at a speed of 50 to 7,000 revolutions per minute (rpm), preferably from 500 to 5,000 rpm, the solution advantageously being applied at a relatively low speed (from about 500 to 2,000 rpm) and thereafter spun dry at a higher speed (from about 5,000 to 7,000 rpm). The thickness of the laser light sensitive layer is from 40 to 160 nm, preferably from 80 to 120 nm. It is dependent on the speed of rotation, on the concentration and viscosity of the spincoating solution and on the temperature.

In the optical recording medium according to the invention, the laser light sensitive layer is present in the form of a homogeneous, thin, smooth layer which is of high optical quality. For instance, the reflectivity values are in general within the range greater than 12%.

The novel recording medium, furthermore, is sufficiently sensitive at the wavelength of a laser light source used that the incidence of light pulses of an energy content of a few nJ which are focused to a focal point diameter of $\leq 1$ μm leads to the formation of pits with an excellent signal-to-noise ratio.

Laser light sources which are particularly highly suitable, on account of the small size of the device, its low energy consumption and the option of direct modulation of the optical power output by modulating the electrical drive current, are solid-state injection lasers which emit in the near infrared, in particular the Al-GaAs laser which operates within the wavelength region from about 750 to 900 nm.

The following Examples will illustrate the invention in more detail:

A) Preparation of azulene derivatives

EXAMPLE 1

Guaiazulenepropionic Acid (azulene-7-isopropyl-1-methyl-4-propionic acid) (IIb.9)

70.0 ml (0.12 mol) of a 15% strength by weight solution of n-butyllithium in hexane are added dropwise at −40° C. under argon with stirring to a solution of 19.8 g (0.10 mol) of guaiazulene and 22.0 ml (0.16 mol) of diisopropylamine in 300 ml of anhydrous diethyl ether. The solution was then allowed to warm to 0° C. by stirring for 30 minutes and then cooled down again to −40° C., and a solution of 8.6 g (0.06 mol) of bromoacetic acid in 50 ml of anhydrous ether was slowly added dropwise. The blue reaction mixture was warmed to room temperature in the course of 4 hours and subsequently stirred at room temperature for about 12 hours. 100 ml of ice-water were then added for hydrolysis, and the excess or unconverted guaiazulene was extracted with ether until the organic phase was substantially colorless. A total of 7.5 g of guaiazulene were recovered from the the combined organic phases. The aqueous phase was covered with 300 ml of ether, and 2N hydrochloric acid was added to liberate the guaiazulenepropionic acid. The organic phase was separated off, washed with water until acid-free and dried over sodium sulfate. Removal of the solvent by evaporation left 12.3 g (80% based on bromoacetic acid) of guaiazulenepropionic acid in the form of a blue mass of crystals which can be used directly for esterification (see Example 2). The direct conversion of guaiazulenepropionic acid with squaric acid to dyes of the formula I (see Example 4) required subsequent column chromatography over silica gel (9/1 methylene chloride/acetone) in order to remove traces of guaiazulene (about 0.3 g) and separate off a brown residue.

Yield: 10.5 g (68%); mp.: 139°–140° C.

IR (KBr): $\nu$=3460 broad, 2961, 2925, 2864, 1699 (C=O)s, 1555, 1527, 1460, 1419, 1408, 1389, 1301, 1215, 921, 776 cm$^{-1}$; $^1$H-NMR (CDCl$_3$): $\sigma$=1.38 d(6H), 2.68 s(3H), 2.90 t(2H), 3.08 q(1H), 3.50 t(2H), 7.06 d(1H), 7.29 d(1H), 7.43 d(d) (1H), 7.64 d(1H), 8.20 d(1H); $^{13}$C-NMR (CDCl$_3$): $\sigma$=12.91, 24.72 (2C), 33.95, 35.27, 38.28, 112.06, 124.13, 125.58, 133.53, 135.26, 136.42, 136.52, 136.77, 140.40, 146.01, 179.02; MS: m/e=256 (M$^{61}$, 100%), 241 (M$^{61}$ -CH$_3$, 75%), 211, 195, 181, 165, 152, 141, 128, 115.

The same method was used to prepare the 4-methyl-substituted guaiazulene- and 4,6,8-trimethylazulenealkylcarboxylic acids of Table 1.

EXAMPLE 2

Methyl Guaiazulenepropionate (Methyl Azulene-7-Isopropyl-1-Methyl-4-Propionate) (IIb.10)

12.8 g (0.05 mol) of guaiazulenepropionic acid (Example 1), 12 ml of methanol and 0.3 g of p-toluenesulfonic acid were refluxed in 250 ml of carbon tetrachloride. The reaction, which was monitored by means of thin layer chromatography (TLC), came to an end after about 6 hours. The reaction mixture was then discharged onto water, and the organic phase was washed with saturated sodium bicarbonate solution and then with water and subsequently dried over sodium sulfate. The highly viscous crude product (13.1 g, 97%) was purified by column chromatography over neutral silica gel (9/1 methylene chloride/acetone).

Yield: 12.0 g (89%) of a blue highly viscous oil.

UV (CH$_2$Cl$_2$): $\lambda$max=300 nm, $\epsilon$=43130; IR (film): $\nu$=2958, 2927, 1739 (C=O)s, 1555, 1461, 1435, 1388, 1363, 1195, 1170, 780 cm$^{-1}$; $^1$H-NMR (CDCl$_3$): $\sigma$=1.35 d(6H), 2.65 s(3H), 2.84 t(2H), 3.18 q(1H), 3.47 t(2H), 3.71 s(3H), 7.01 d(1H), 7.29 d(1H), 7.42 d(1H), 7.63 d(1H), 8.19 d(1H); d(1H), 7.29 d(1H), 7.43 d(d) (1H), 7.64 d(1H), 8.20 d(1H); $^{13}$C-NMR (CDCl$_3$): $\sigma$=12.90 24.72 (2C), 33.31, 35.37, 38.27, 51.66, 112.14, 124.24, 125.50, 133.44, 135.24, 136.40, 136.74 (2C), 140.28, 146.47, 173.40; MS: m/e=270 (M$^\oplus$, 100%).

EXAMPLE 3

Isopropyl Guaiazulenepropionate (Isopropyl Azulene-7-Isopropyl-1-Methyl-4-Propionate) (IIb.13)

The preparation was carried out similarly to Example 2 using 6.4 g (25 mmol) of guaiazulenecarboxylic acid, except that methanol was replaced by isopropanol. The reaction came to an end after 10 hours.

Yield 5.3 g (71%) of a blue oil.

IR (film): $\nu$=2959, 2932, 1730 (C=O)s, 1556, 1464, 1387, 1372, 1260, 1181, 1146, 1108 s, 982 cm$^{-1}$; $^1$H-

NMR (CDCl$_3$): S = 1.24 d(8H), 1.38 d(6H), 2.70 s(3H), 2.83 t(2H), 3.12 q(1H), 3.51 t(2H), 5.07 q(1H), 7.3 d(d) (2H), 7.35 s(1H), 7.72 s(1H), 8.26 s(1H).

$^{13}$C-NMR (CDCl$_3$): S = 12.86, 21.82 (2C), 24.71 (2C), 33.38, 35.99, 38.27, 67.76, 112.24, 124.30, 125.43, 133.29, 135.12, 136.49, 136.72, 136.89, 140.17, 146.69, 172.41. MS: m/e = 298 (M$^{\oplus}$, 100%).

The method of Examples 2 and 3 was used to prepare the 4-methyl-substituted guaiazulene- and 4,6,8-trimethylazulene-alkylcarboxylic esters of Table 1.

EXAMPLE 4

Guaiazulenepropanol
(7-Isopropyl-1-Methyl-4-(3-Hydroxypropyl)azulene)
(IIb.45)

10 g (37 mmol) of methyl guaiazulenepropionate (Example 2) were reduced with 1.5 g (39 mmol) of lithium aluminum hydride in 200 ml of anhydrous ether. After the reaction had ended (TLC check), the reaction mixture was admixed with a little methanol and worked up with water, and the crude product was filtered through a short silica gel column.

Yield: 8.5 g (95%).

MS: m/e = 242 (M$^{\oplus}$, 20%), 198 (n-C$_2$H$_4$O, 100%), 183 (40%), 43.

EXAMPLE 5

4,6-Dimethyl-8-(3-hydroxypropyl)azulene (IIa.16)

5.0 g (20.7 mmol) of 4,6-dimethyl-8-2-(ethoxycarbonyl)ethyl)azulene (IIa.10) were reduced with 0.8 g (21 mmol) of lithium aluminum hydride in 100 ml of anhydrous tetrahydrofuran. After the reaction had ended (TLC check) the reaction mixture was admixed with a little methanol and worked up with water, and the crude product (4.1 g) was chromatographed over silica gel.

Yield: 2.5 g (56%).

$^1$H-NMR (CDCl$_3$): S = 1.65 s broad (1H, OH), 2.10 q(2H), 2.63 s(3H), 2.86 s(3H), 3.29 t(2H), 3.72 t(2H), 7.02 s(1H), 7.02 s(1H), 7.06 s(1H), 7.36 m(1H), 7.64 s(1H).

MS: m/e = 214 (M$^{\oplus}$, 25%), 170 (M-C$_2$H$_4$O, 100%), 155 (M$^{\oplus}$-C$_3$H$_6$OH, 60%), 141, 128, 115, 43 (25%).

EXAMPLE 6

3-(7-Isopropyl-1-methyl)azulen-4-yl-2-ethylpropionic acid 70.0 ml (0.12 mol) of a 15% strength by weight solution of n-butyllithium in hexane were added dropwise at −10° C. with stirring under argon to a solution of 19.8 g (0.10 mol) of guaiazulene and 22.0 ml (0.16 mol) of diisopropylamine in 300 ml of anhydrous methyl tert-butyl ether. The temperature of the solution was allowed to rise to 0° C. in the course of 30 minutes while stirring, and then the solution was cooled down again to −5° C., and a solution of 12.4 g (0.07 mol) of DL-2-bromobutyric acid in 50 ml of anhydrous methyl tert-butyl ether was then slowly added dropwise. The blue reaction mixture was warmed to room temperature in the course of 4 hours and subsequently stirred at room temperature for about 18 hours. 100 ml of ice-water were then added for hydrolysis, and excess or unconverted guaiazulene was then extracted with ether until the organic phase was substantially colorless. The aqueous phase was covered with 300 ml of methyl tert-butyl ether, and 2N hydrochloric acid was added to free the 3-(7-isopropyl-1-methyl)azulen-4-yl-2-ethylpropionic acid. The organic phase was separated off, washed with water until acid-free and dried over sodium sulfate. Removal of the solvent by evaporation left 13.1 g (60% based on DL-2-bromobutyric acid) of 3-(azulene-7-isopropyl-1-methyl-4)-2-ethylpropionic acid in the form of a blue oil which can be used directly for esterification (see Example 2). Direct conversion of 3-(azulene-7-isopropyl-1-methyl-4)-2-ethylpropionic acid with squaric acid to dyes of the formula I required subsequent column chromatography over silica gel (9/1 methylene chloride/acetone) in order to remove traces of guaiazulene (about 0.3 g) and separate the product from DL-2-bromobutyric acid. Physical data:

IR (KBr): $\nu$ = 3064 (OH); 2962, 2934, 2876 (CH), 1706 s(C=O); 1555, 1461, 1422, 1387, 1285 cm$^{-1}$;

$^1$H-NMR (CDCl$_3$): δ = 0.98 t(3H), 1.34 d(6H), 1.70 ddq(2H), 2.65 s(3H), 3.00 m(1H), 3.05 q(1H), 3.25 ABM(1H), 3.55 ABM(1H), 6.98, 7.35 AB(2H; 7, 8H), 7.28, 7.59 AB (2H; 4, 5H), 8.19 s(1H), 11.45 s broad (1H; CO$_2$H)→$^{13}$C-NMR (CDCl$_3$): δ = 11.66, 12.84, 24.68 (2C), 25.40, 38.29, 39.98, 48.51, 112.63, 124.74, 125.50, 133.28, 134.77, 136.79, 136.87, 137.63, 140.28, 145.16, 181.83;

MS: m/e = 284 (M$^{61}$, 90%), 269, 198 (100%).

EXAMPLE 7

N-Butyl 3-(7-Isopropyl-1-Methyl)Azulen-4-yl-2-Ethylpropionate 10.0 g (0.035 mol) of 3-(7-isopropyl-1-methyl)azulen-4-yl-2-ethylpropionic acid (Example 6), 20 ml of n-butanol and 0.3 g of p-toluenesulfonic acid were refluxed in 100 ml of carbon tetrachloride. After the reaction had ended (monitoring by thin layer chromatography; about 6 hours), the reaction mixture was discharged onto water, and the organic phase was washed with saturated sodium bicarbonate solution and then with water and subsequently dried over sodium sulfate. The highly viscous crude product (8.6 g, 72%) was purified by column chromatography over silica gel (methylene chloride).

Physical data:
IR (KBr): $\nu$ = 2981s (CH), 2871s, 1731s (C=O); 1460s, 1365, 1219, 1185, 1069s (C-O), 1031, 910s cm$^{-1}$;

$^1$H-NMR (CDCl$_3$): δ = 0.85 t(3H), 0.95 t(3H), 1.24 ps.q(2H), 1.38 d(6H), 1.45 ps.q(2H), 1.72 dq(2H), 2.65 s(3H), 2.90 ps.t(1H), 3.06 q(1H), 3.28, 3.45 ABM(2H), 3.98 t(2H), 6.96, 7.38 AB(2H; 7, 8H), 7.26, 7.60 AB(2H; 4,5H), 8.18 s(1H);

$^{13}$C-NMR (CDCl$_3$): δ = 11.79, 12.84, 13.58, 19.17, 24.72 (2C), 25.90, 30.84, 38.34, 40.49, 48.96, 64.15, 112.65, 124.86, 125.42, 133.21, 134.77, 136.74, 137.76, 140.17, 145.77, 175.58, 179.05;

MS: m/e = 340 (M$^{\oplus}$, 100%), 325, 312, 297, 283, 267, 257, 239, 223, 209, 198 (95%), 183, 167, 155.

EXAMPLE 8

3-(7-Isopropyl-1-Methyl)Azulen-4-yl-2-Ethylpropanol

A solution of 14.2 g (0.05 mol) of 3-(7-isopropyl-1-methyl)azulen-4-yl-2-ethylpropionic acid in 100 ml of tetrahydrofuran was admixed with 2.8 g of lithium alanate a little at a time, and the reaction mixture was stirred at room temperature for 2 hours. It was then hydrolysed with a total of 150 ml of water and repeatedly extracted with methylene chloride. The crude product remaining on drying the organic phase over sodium sulfate and removing the solvent under reduced pressure was purified by column chromatography (silica gel; methylene chloride, methanol) leaving 8.3 g (66%) of 3-(7-isopropyl-1-methyl)azulen-4-yl-2-ethyl-propanol as a deep blue oil.

Physical data:

IR (KBr): $\nu=3350$ broad (OH); 2958, 2927, 2872 (CH); 1553, 1461, 1421, 1387 cm$^{-1}$;

$^1$H-NMR (CDCl$_3$): $\delta=0.98$ t(3H), 1.35 d(6H), 1.49 dq(2H), 2.00 m(1H), 2.66 s(3H), 3.05 q(1H), 3.08, 3.18 ABM(2H), 3.50 mc(2H), 6.98, 7.36 AB(2H; 7, 8H), 7.32, 7.62 AB (2H; 4, 5H), 8.19 s(1H);

$^{13}$C-NMR (CDCl$_3$): $\delta=11.46$, 12.90, 24.39, 24.73 (2C), 38.23, 39.65, 44.34, 64.71, 112.58, 125.25 (2C), 133.17, 134.82, 136.10, 136.45, 137.98, 139.80, 147.86;

MS: m/e=270 (M$^\oplus$, 50%), 198 (100%).

EXAMPLE 9

3-(7-Isopropyl-1-methyl)azulen-4-yl-propanol

A solution of 13.5 g (0.05 mol) of 3-(7-isopropyl-1-methyl)azulen-4-yl-propionic acid was reacted with 3.0 g of lithium alanate in 100 ml of tetrahydrofuran and worked up, both steps being carried out as described in Example 8. Column chromatography (silica gel; methylene chloride, methanol) left 6.5 g (52%, of 3-(7-isopropyl-1-methyl)azulen-4-yl-propanol as a blue oil.

EXAMPLE 10

3-(7-Isopropyl-1-methyl)azulen-4-yl-n-propanyl pivalate 9.6 g (0.08 mol) of pivaloyl chloride in 20 ml of tetrahydrofuran were slowly added dropwise at room temperature to a solution of 9.6 g (0.04 mol) of azulene-7-isopropyl-1-methyl-4-propanol and 40 ml of triethylamine in 200 ml of tetrahydrofuran. The reaction mixture was subsequently stirred for 6 hours and then discharged onto 200 ml of water, and the mixture was repeatedly extracted with methylene chloride. Drying the organic phase with sodium sulfate and drawing off the solvent left 12.1 g (93%) of 3-(7-isopropyl-1-methyl-)azulen-4-yl-n-propanyl pivalate as a dark blue oil which is used without purification for the dyeing reaction (similarly to Example 8).

EXAMPLE 11

3-(7-Isopropyl-1-methyl)azulen-4-yl-n-propanylbiphenyl phosphinate 15.6 g (0.066 mol) of biphenylphosphinoyl chloride in 20 ml of tetrahydrofuran were slowly added dropwise at room temperature to a solution of 8.0 g (0.03 mol) of azulene-7-isopropyl-1-methyl-4-propanol and 20 ml of triethylamine in 100 ml of tetrahydrofuran. The batch was subsequently stirred for 6 hours and worked up as described in Example 10. Filtration of the crude product through silica gel (methylene chloride) left 12.2 g (83%) of 3-(7-isopropyl-1-methyl)azulen-4-yl-n-propanylbiphenyl phosphinate as a deep blue oil. Physical data:

IR (KBr): $\nu=3060$, 2958 (CH); 1439 s(PO); 1228s, 1130s, 1013s, 997s, 729, 697, 560, 536 cm$^{-1}$;

$^1$H-NMR (CDCl$_3$): $\delta=1.37$ d(6H), 2.28 mc(2H), 2.68 s(3H), 3.08 q(1H), 3.31 ps.t(2H), 4.15 ps.q(2H), 7.00, 7.50 AB(2H: H-7.8), 7.28, 7.63 AB(2H; 4.5-H), 7.45 m(6H; P-PhH), 7.85 m(4H; Ph-H), 8.20 s(1H); $^{31}$p-NMR (CDCl$_3$): $\delta=32.10$ ppm;

MS: m/e=442 (M$^\oplus$, 30%), 224, 209, 198, 183, 181.

EXAMPLE 12

1-(p-Methoxybenzyl)-4,6,8-trimethylazulene

To 3.0 g (0.04 mol) of trimethylazulene in 40 ml of absolute diethyl ether were added 4.0 g of 85% strength by weight of ethereal HBF$_4$ solution, and the mixture was stirred until colorless. The precipitate formed was filtered off with suction, washed with ether and then heated together with 28 g of p-methoxybenzaldehyde to from 90° to 100° C. 100 ml of ether were added, and the resulting red precipitate was filtered off with suction and washed with diethyl ether. The precipitate was then suspended in 200 ml of diethyl ether and admixed, by stirring, with 3.5 g of lithium alanate added a little at a time. After all the lithium alanate had been added, the mixture was hydrolyzed with water and 2N sulfuric acid. The organic phase was separated off and dried over sodium sulfate. The crystalline residue left on drawing off the solvent was purified by filtration through silica gel (methylene chloride). 1.5 g (13%, based on trimethylazulene) of 1-(p-methoxybenzyl)-4,6,8-trimethylazulene were obtained as blue crystals.

The same method was used to obtain the azulene derivatives of the formula

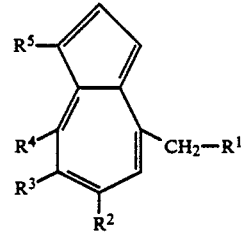

listed in Table 1.

TABLE 1

| Compound No. | R$^1$ | R$^2$ | R$^3$ | R$^4$ | R$^5$ |
|---|---|---|---|---|---|
| II.1 | CH$_2$CO$_2$sC$_4$H$_9$ | H | CH(CH$_3$)$_2$ | H | CH$_3$ |
| II.2 | CH$_2$CO$_2$CH$_2$—⟨⟩ | H | CH(CH$_3$)$_2$ | H | CH$_3$ |
| II.3 | CH$_2$CO$_2$CH$_2$CH$_2$Br | H | CH(CH$_3$)$_2$ | H | CH$_3$ |
| II.4 | CHCO$_2$CH$_3$<br>\|<br>CH$_3$ | H | CH(CH$_3$)$_2$ | H | CH$_3$ |
| II.5 | CHCO$_2$nC$_4$H$_9$<br>\|<br>CH$_3$ | H | CH(CH$_3$)$_2$ | H | CH$_3$ |

TABLE 1-continued

| Compound No. | R$^1$ | R$^2$ | R$^3$ | R$^4$ | R$^5$ |
|---|---|---|---|---|---|
| II.6 | CH(C$_2$H$_5$)CO$_2$CH$_3$ | H | CH(CH$_3$)$_2$ | H | CH$_3$ |
| II.7 | CH(C$_2$H$_5$)CO$_2$C$_2$H$_5$ | H | CH(CH$_3$)$_2$ | H | CH$_3$ |
| II.8 | CH(C$_2$H$_5$)CO$_2$nC$_3$H$_7$ | H | CH(CH$_3$)$_2$ | H | CH$_3$ |
| II.9 | CH(C$_2$H$_5$)CO$_2$iC$_3$H$_7$ | H | CH(CH$_3$)$_2$ | H | CH$_3$ |
| II.10 | CH(C$_2$H$_5$)CO$_2$nC$_4$H$_9$ | H | CH(CH$_3$)$_2$ | H | CH$_3$ |
| II.11 | CH(C$_2$H$_5$)CO$_2$sC$_4$H$_9$ | H | CH(CH$_3$)$_2$ | H | CH$_3$ see Ex. 7 |
| II.12 | CH(C$_6$H$_5$)CO$_2$C$_4$H$_5$ | H | CH(CH$_3$)$_2$ | H | CH$_3$ |
| II.13 | CH$_2$OC(O)CH$_3$ | H | CH(CH$_3$)$_2$ | H | CH$_3$ |
| II.14 | (CH$_2$)$_2$OC(O)CH$_3$ | H | CH(CH$_3$)$_2$ | H | CH$_3$ |
| II.15 | (CH$_2$)$_2$OC(O)C(CH$_3$)$_3$ | H | CH(CH$_3$)$_2$ | H | CH$_3$ see Ex. 10 |
| II.16 | (CH$_2$)$_2$OC(O)C$_9$H$_{19}$ | H | CH(CH$_3$)$_2$ | H | CH$_3$ |
| II.17 | CH$_2$OC(O)—C$_6$H$_5$ | H | CH(CH$_3$)$_2$ | H | CH$_3$ |
| II.18 | (CH$_2$)$_2$OC(O)—C$_6$H$_5$ | H | CH(CH$_3$)$_2$ | H | CH$_3$ |
| II.19 | (CH$_2$)$_2$OC(O)—(2,4-(OCH$_3$)$_2$-3-CH$_3$-C$_6$H$_2$) | H | CH(CH$_3$)$_2$ | H | CH$_3$ |
| II.20 | (CH$_2$)$_2$OP(O)(C$_6$H$_5$)$_2$ | H | CH(CH$_3$)$_2$ | H | CH$_3$ see Ex. 11 |
| II.21 | (CH$_2$)$_2$OP(O)(CH$_3$)C$_2$H$_5$ | H | CH(CH$_3$)$_2$ | H | CH$_3$ |
| II.22 | CH(C$_2$H$_5$)CH$_2$OP(O)(CH$_3$)(C$_2$H$_5$) | H | CH(CH$_3$)$_2$ | H | CH$_3$ |
| II.23 | (CH$_2$)$_2$OP(O)(CH$_3$)$_2$ | H | CH(CH$_3$)$_2$ | H | CH$_3$ |
| II.24 | (CH$_2$)$_2$OCH$_3$ | H | CH$_3$ | H | CH$_3$ |
| II.25 | CO$_2$C$_2$H$_5$ | CH$_3$ | H | CH$_3$ | H |
| II.26 | CO$_2$nC$_3$H$_7$ | CH$_3$ | H | CH$_3$ | H |
| II.27 | CO$_2$iC$_3$H$_7$ | CH$_3$ | H | CH$_3$ | H |
| II.28 | H | CH$_3$ | H | CH$_3$ | CH(CH$_3$)$_2$ |
| II.29 | H | CH$_3$ | H | CH$_3$ | CH(CH$_3$)—C$_8$H$_{17}$ |
| II.30 | H | CH$_3$ | H | CH$_3$ | CH(CH$_3$)—C$_{12}$H$_{25}$ |

TABLE 1-continued

| Compound No. | R¹ | R² | R³ | R⁴ | R⁵ |
|---|---|---|---|---|---|
| II.31 | H | | CH₃ | H | CH₃ |  |
| II.32 | H | | CH₃ | H | CH₃ |  |
| II.33 | H | | CH₃ | H | CH₃ | 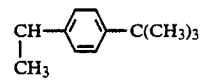 |
| II.34 | H | | CH₃ | H | CH₃ | 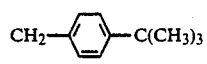 see Ex. 12 |
| II.35 | H | | CH₃ | H | CH₃ | 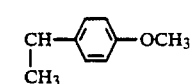 |
| II.36 | H | | CH₃ | H | CH₃ | 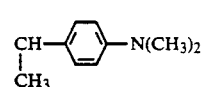 |
| II.37 | H | | CH₃ | H | CH₃ | 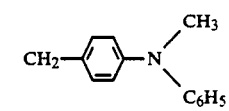 |
| II.38 | H | | CH₃ | H | CH₃ | 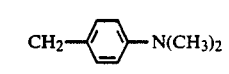 |
| II.39 | H | | CH₃ | H | CH₃ | 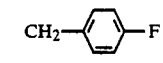 |
| II.40 | H | 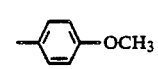 | H | CH₃ | H |
| II.41 | H | 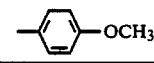 | H | 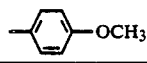 | H |

TABLE 2

List of azulene derivatives of the abovementioned formulae IIa and IIb used an characterization of the novel compounds

| Compound No. | R¹ | Comments: Literature references[1]) and characterization of novel compounds |
|---|---|---|
| IIa.1 | H | Reference substance: 4,6,8-trimethyl-azulene (mp.: 78–80° C.) |
| IIa.2 | CH₃ | C₁₄H₁₆ (184,28); MS: m/e = 184 (M⊕, 100%), 169, 155, 154. |
| IIa.3 | CH(CH₃)₂ | C₁₆H₂₀ (212,34); MS: m/e = 212 (M⊕), 197, 43. |
| IIa.4 | C₄H₉ | C₁₇H₂₂ (226,36); MS: m/e = 226 (M⊕, 100%), 211, 196, 154. |
| IIa.5 | CH₂C₆H₅ | K. Hafner et al., Liebigs Ann. 650, (1961), 80 (HW[1]), p. 338); C₂₀H₂₁ (261,39); MS: m/e = 261 (M⊕, 20%), 246 (M⊕-CH₃), 184 (M⊕-C₆H₅), 170 (M⊕-CH₂C₆H₅), 91 (C₇H₇, 100%). |
| IIa.6 | CO₂H | K. Hafner et al., Liebigs Ann. 650, (1961), 80 (HW[1]), p. 341); mp.: 121–122° C. C₁₅H₁₄O₂ (226.28); MS: m/e = 226 (M⊕, 100%); IR: $\bar{\nu}$ = 1698 (C=O) cm⁻¹. |
| IIa.7 | CO₂CH₃ | K. Hafner et al., Liebigs Ann. 650, |

TABLE 2-continued

List of azulene derivatives of the abovementioned formulae IIa and IIb used an characterization of the novel compounds

| Compound No. | $R^1$ | Comments: Literature references[1] and characterization of novel compounds |
|---|---|---|
| | | (1961), 80<br>(HW[1], p. 341); mp.: 43–44° C.<br>$C_{16}H_{16}O_2$ (240,30); MS: m/e = 240 ($M^{\oplus}$, 100%), 225, 210, 194, 166, 59;<br>IR: $\bar{\nu}$ = 1732 (C=O) cm$^{-1}$. |
| IIa.8 | $CO_2C_4H_9$ | $C_{19}H_{25}O_2$ (285,41); MS: m/e = 285 ($M^{\oplus}$), 270, 228, 212, 184, 101, 73;<br>IR: $\bar{\nu}$ = 1731 (C=O) cm$^{-1}$. |
| IIa.9 | $CH_2CO_2H$ | R. Neidlein and W. Kramer, Helv. Chim. Acta 65, (1982), 280<br>mp.: 90–92° C. |
| IIa.10 | $CH_2CO_2CH_3$ | violet oil: IR (Film): $\nu$ = 3090, 3063, 2985, 2945, 1737 (C=O)s, 1576, 1543, 1488, 1435, 1322, 1211, 1196, 1170 (C—O), 848, 735 cm$^{-1}$; $^1$H-NMR (CDCl$_3$): $\delta$ = 2.59 s(3H), 2.81 t(2H), 2.82 s(3H), 3.50 t(3H), 3.66 s(3H), 7.01 s(1H), 7.04 s(1H), 7.37 d(1H), 7.42 d(1H), 7.68 t(1H); $^{13}$C-NMR (CDCl$_3$): $\delta$ = 25.10, 28.67, 34.23, 35.82, 51.66, 115.37, 116.37, 126.20, 127.38, 132.94, 135.47, 136.20, 145.63, 146.56, 147.75, 173.26;<br>MS: m/e = 242 ($M^{\oplus}$, 100%), 227 ($M^{\oplus}$-CH$_3$, 8%) 211 ($M^{\oplus}$-OCH$_3$; 15%) 183 ($M^{\oplus}$-CO$_2$CH$_3$, 50%) 168, 153, 141, 43 (CH$_3$CO$^{\oplus}$, 40%). |
| IIa.11 | $CH_2CO_2C_2H_5$ | $C_{17}H_{20}O_2$ (256, 35); MS: m/e = 256 ($M^{\oplus}$, 100%); IR: $\bar{\nu}$ = 2968, 1733 s(C=O), 1576, 1544, 1436, 1371, 1276, 1179, 1158, 1034, 752 cm$^{-1}$.<br>$^1$H-NMR (CDCl$_3$): $\delta$ = 1.24 t(3H), 2.61 s(3H), 2.82 q(2H), 2.86 s(3H), 3.50 t(2H), 4.15 q(2H), 7,04 s(1H), 7.06 s(1H), 7.34 d(1H), 7.39 d(1H), 7.65 t(1H);<br>$^{13}$C-NNR (CDCl$_3$): $\delta$ = 14.26, 25.03, 28.64, 34.32, 36.21, 60.49, 115.62, 116.53, 126.20, 127.35, 133.06, 135.84, 136.55, 145.57, 146.41, 147.96, 172.81. |
| IIa.12 | $CH_2CO_2nC_3H_7$ | $C_{18}H_{22}O_2$ (270,37); MS: m/e = 270 ($M^{\oplus}$);<br>IR: $\bar{\nu}$ = 2967, 1733 s(C=O), 1576, 1544, 1463, 1436, 1276, 1211, 1177, 752 cm$^{-1}$.<br>$^1$H-NMR (CDCl$_3$): $\delta$ = 0.93 t(3H), 1.66 q(2H), 2.60 s(3H), 2.85 q(2H), 2.86 s(3H), 3.52 t(2H), 4.08 q(2H), 7.04 s(1H), 7.07 s(1H), 7.35 d(1H), 7.40 d(1H), 7.67 t(1H);<br>$^{13}$C-NMR (CDCl$_3$): $\delta$ = 10.34, 22.09, 25.04, 28.64, 34.33, 36.17, 66.21, 115.57, 116.49, 126.18, 127.35, 133.03, 135.78, 136.50, 145.58, 146.43, 147.95, 172.90. |
| IIa.13 | $CH_2CO_2iC_3H_7$ | $C_{18}H_{22}O_2$ (270,37);<br>MS: m/e = 270 ($M^{\oplus}$, 100%);<br>IR: $\bar{\nu}$ = 1732 (C=O) cm$^{-1}$.<br>$^1$H-NMR (CDCl$_3$): $\delta$ = 1.21 d(6H), 2.59 s(3H), 2.80 t(2H), 2.83 s(3H), 3.49 t(2H), 5.04 q(1H), 7.03 s(1H), 7.06 s(1H), 7.34 d(1H), 7.40 d(1H), 7.64 t(1H);<br>$^{13}$C-NMR (CDCl$_3$): $\delta$ = 21.86 (2C), 25.02, 28.63, 34.31, 36.49, 67.86, 115.61, 116.47, 126.19, 127.31, 133.00, 135.82, 136.51, 145.55, 146.37, 148.03, 172.36. |
| IIa.14 | $CH_2CO_2C_4H_9$ | $C_{19}H_{24}O_2$ (284.40);<br>MS: m/e = 284 ($M^{\oplus}$, 100%);<br>IR: $\bar{\nu}$ = 1730 (C=O) cm$^{-1}$. |
| IIa.15 | $CH_2CO_2C_8H_{17}$ | $C_{23}H_{32}O_2$ (340.51); MS: m/e = 340 ($M^{\oplus}$);<br>IR: $\bar{\nu}$ = 1730 (C=O) cm$^{-1}$. |
| IIa.16 | $(CH_2)_2OH$ | see Example 5 |
| IIa.17 | $(CH_2)_2CO_2H$ | $C_{16}H_{18}O_2$ (242,34); MS: m/e = 242 ($M^{\oplus}$, 100%); IR: $\bar{\nu}$ = 2957, 2924, 1695 |

TABLE 2-continued

List of azulene derivatives of the abovementioned formulae IIa and IIb used an characterization of the novel compounds

| Compound No. | R[1] | Comments: Literature references[1] and characterization of novel compounds |
|---|---|---|
| | | (C=O)s, 1466, 1434, 1416, 1287, 1274, 1207, 784 cm$^{-1}$; $^1$H-NMR (CDCl$_3$): $\delta$ = 2.16 h(2H), 2.42 t(2H), 2.57 s(3H), 2.82 s(3H), 3.20 t(2H), 6.99 s(2H), 7.34 d(1H), 7.39 d(1H), 7.64 t(1H); $^{13}$C-NMR (CDCl$_3$): $\delta$ = 24.99, 26.48, 28.62, 33.88, 38.10, 115.75, 116.43, 126.28, 127.11, 132.82, 136.17, 136.38, 145.45, 146.23, 148.80, 179.44. |
| IIa.18 | (CH$_2$)$_2$CO$_2$CH$_3$ | C$_{17}$H$_{20}$O$_2$ (256,35); MS: m/e = 256 (M$^\oplus$, 100%); IR: $\bar{\nu}$ = 1729 (C=O) cm$^{-1}$. |
| IIa.19 | (CH$_2$)$_2$CO$_2$C$_2$H$_5$ | C$_{18}$H$_{22}$O$_2$ (270,37); MS: m/e = 270 (M$^\oplus$, 100%); IR: $\bar{\nu}$ = 1730 (C=O) cm$^{-1}$. |
| IIa.20 | (CH$_2$)$_2$CO$_2$iC$_3$H$_5$ | C$_{19}$H$_{24}$O$_2$ (284,40); MS: m/e = 284 (M$^\oplus$, 100%); IR: $\bar{\nu}$ = 1733 (C=O) cm$^{-1}$. |
| IIa.21 | (CH$_2$)$_2$CO$_2$C$_4$H$_9$ | C$_{20}$H$_{26}$O$_2$ (298,43); MS: m/e = 298 (M$^\oplus$, 100%); IR: $\bar{\nu}$ = 1731 (C=O) cm$^{-1}$. |
| IIa.22 | (CH$_2$)$_3$OH | C$_{16}$H$_{20}$O$_2$ (228,34); MS: m/e = 228 (M$^\oplus$), 211; IR: $\bar{\nu}$ = 3520 (OH) cm$^{-1}$. |
| IIa.23 | (CH$_2$)$_4$CO$_2$H | C$_{18}$H$_{22}$O$_2$ (270,37); MS: m/e = 270 (M$^\oplus$); IR: $\bar{\nu}$ = 2959, 2926, 1697 (C=O)s cm$^{-1}$. |
| IIa.24 | (CH$_2$)$_4$CO$_2$CH$_3$ | C$_{18}$H$_{24}$O$_2$ (284,40); MS: m/e = 284 (M$^\oplus$); IR: $\bar{\nu}$ = 1732 (C=O) cm$^{-1}$. |
| IIa.25 | (CH$_2$)$_5$CO$_2$H | C$_{19}$H$_{24}$O$_2$ (284,40); MS: m/e = 284 (M$^\oplus$); IR: $\bar{\nu}$ = 2957, 2925, 1696 (C=O)s cm$^{-1}$. |
| IIa.26 | (CH$_2$)$_5$CO$_2$CH$_3$ | C$_{20}$H$_{26}$O$_2$ (298,43); MS: m/e = 298 (M$^\oplus$); IR: $\bar{\nu}$ = 1730 (C=O) cm$^{-1}$. |
| IIa.27 | (CH$_2$)$_9$CO$_2$H | C$_{23}$H$_{32}$O$_2$ (340,51); MS: m/e = 340 (M$^\oplus$); IR: $\bar{\nu}$ = 2958, 2927, 1697 (C=O)s cm$^{-1}$. |
| IIa.28 | (CH$_2$)$_9$CO$_2$CH$_3$ | C$_{24}$H$_{34}$O$_2$ (354,54); MS: m/e = 354 (M$^\oplus$); IR: $\bar{\nu}$ = 1733 (C=O) cm$^{-1}$. |
| IIb.29 | H | Reference substance: guaiazulene (mp.: 29-30° C.) |
| IIb.30 | CH$_3$ | K. Hafner, H. Pelster and H. Patzelt, Liebigs Ann. 650, (1961), 80; (HW[1], p. 336f); C$_{16}$H$_{20}$ (212,34); MS: m/e = 212 (M$^\oplus$, 100%). |
| IIb.31 | CH(CH$_3$)$_2$ | C$_{18}$H$_{24}$ (240,39); MS: m/e = 240 (M$^\oplus$, 100%). |
| IIb.32 | C$_4$H$_9$ | C$_{19}$H$_{26}$ (254,42); MS: m/e = 254 (M$^\oplus$, 100%). |
| IIb.33 | CH$_2$C$_6$H$_5$ | C$_{22}$H$_{24}$ (288,43); MS: m/e = 288 (M$^\oplus$), 91 (C$_7$H$_7$$^\oplus$, 100%), |
| IIb.34 | CO$_2$H | K. Hafner et al., Liebigs Ann. 650, (1961), 80, (HW[1], p. 341); mp.: 102-103° C.; C$_{16}$H$_{18}$O$_2$ (242,32); MS: m/e = 242 (M$^\oplus$, 100%); IR: $\bar{\nu}$ = 1702 (C=O) cm$^{-1}$. |
| IIb.35 | CO$_2$CH$_3$ | C$_{17}$H$_{20}$O$_2$ (256,35); MS: m/e = 256 (M$^\oplus$, 100%); IR: $\bar{\nu}$ = 1731 (C=O) cm$^{-1}$. |
| IIb.36 | CO$_2$C$_4$H$_9$ | C$_{20}$H$_{26}$O$_2$ (298,43); MS: m/e = 298 (M$^\oplus$, 100%); IR: $\bar{\nu}$ = 1731 (C=O) cm$^{-1}$. |
| IIb.37 | CH$_2$CO$_2$H | C$_{17}$H$_{20}$O$_2$ (256,35); MS: m/e = 256 (M$^\oplus$, 100%); IR: $\bar{\nu}$ = 1704 (C=O) cm$^{-1}$. |
| IIb.38 | CH$_2$CO$_2$CH$_3$ | C$_{18}$H$_{22}$O$_2$ (270,37); MS: m/e = 270 (M$^\oplus$, 100%); IR: $\bar{\nu}$ = 1735 (C=O) cm$^{-1}$. |
| IIb.39 | CH$_2$CO$_2$C$_2$H$_5$ | C$_{19}$H$_{24}$O$_2$ (284,40); MS: m/e = 284 (M$^\oplus$, 100%); IR: $\bar{\nu}$ = 1732 (C=O) cm$^{-1}$. |
| IIb.40 | CH$_2$CO$_2$nC$_3$H$_7$ | C$_{20}$H$_{26}$O$_2$ (298,43); MS: m/e = 298 (M$^\oplus$, 100%); IR: $\bar{\nu}$ = 1733 (C=O) cm$^{-1}$. |
| IIb.41 | CH$_2$CO$_2$iC$_3$H$_7$ | C$_{20}$H$_{26}$O$_2$ (398,43); MS: m/e = 298 (M$^\oplus$, 100%); IR: $\bar{\nu}$ = 1730 (C=O) cm$^{-1}$. |
| IIb.42 | CH$_2$CO$_2$C$_4$H$_9$ | C$_{21}$H$_{28}$O$_2$ (312,45); MS: m/e = 312 (M$^\oplus$, 100%); IR: $\bar{\nu}$ = 1731 (C=O) cm$^{-1}$. |
| IIb.43 | CH$_2$CO$_2$C$_8$H$_{17}$ | C$_{25}$H$_{36}$O$_2$ (368,56); MS: m/e = 368 (M$^\oplus$, 100%); IR: $\bar{\nu}$ = 1730 (C=O) cm$^{-1}$. |
| IIb.44 | CH$_2$CO$_2$[(CH$_2$)$_2$O]$_2$C$_2$H$_5$ | C$_{23}$H$_{34}$O$_4$ (374,52); IR: $\bar{\nu}$ = 1731 (C=O) cm$^{-1}$. |
| IIb.45 | (CH$_2$)$_2$OH | see Example 4 |
| IIb.46 | (CH$_2$)$_2$CO$_2$H | C$_{18}$H$_{22}$O$_2$ (270,37); MS: m/e = 270 (M$^\oplus$, 100%); IR: $\bar{\nu}$ = 1702 (C=O) cm$^{-1}$. $^1$H-NMR (CDCl$_3$): $\delta$ = 1.36 d(6H), 2.19 p(2H), 2.28 t(2H), 2.68 s(3H), 3.09 |

TABLE 2-continued

List of azulene derivatives of the abovementioned formulae IIa and IIb used an characterization of the novel compounds

| Compound No. | $R^1$ | Comments: Literature references[1] and characterization of novel compounds |
|---|---|---|
| | | q(1H), 3.23 t(2H), 7.01 d(1H), 7.30 d(1H), 7.34 d(1H), 7.64 d(1H), 8.18 s(1H). |
| IIb.47 | $(CH_2)_2CO_2CH_3$ | $C_{19}H_{24}O_2$ (284,40); MS: m/e = 284 $(M^\oplus, 100\%)$; IR: $\bar{\nu}$ = 1731 (C=O) $cm^{-1}$. |
| IIb.48 | $(CH_2)_2CO_2C_2H_5$ | $C_{20}H_{26}O_2$ (298,43); MS: m/e = 298 $(M^\oplus, 100\%)$; IR: $\bar{\nu}$ = 1730 (C=O) $cm^{-1}$. |
| IIb.49 | $(CH_2)_2CO_2iC_3H_7$ | $C_{21}H_{28}O_2$ (312,45); MS: m/e = 312 $(M^\oplus, 100\%)$; IR: $\bar{\nu}$ = 1731 (C=O) $cm^{-1}$. |
| IIb.50 | $(CH_2)_2CO_2C_4H_9$ | $C_{22}H_{30}O_2$ (326,48); MS: m/e = 326 $(M^\oplus, 100\%)$; IR: $\bar{\nu}$ = 1730 (C=O) $cm^{-1}$. |
| IIa.51 | $(CH_2)_3OH$ | $C_{18}H_{24}O_2$ (256,39); MS: m/e = 256 $(M^\oplus)$ 241, 238, 225, 183; IR: $\bar{\nu}$ = 1731 (C=O) $cm^{-1}$. |
| IIa.52 | $(CH_2)_4CO_2H$ | $C_{20}H_{26}O_2$ (298,43); MS: m/e = 298 $(M^\oplus, 100\%)$; IR: $\bar{\nu}$ = 1703 (C=O) $cm^{-1}$. |
| IIa.53 | $(CH_2)_4CO_2CH_3$ | $C_{21}H_{28}O_2$ (312,45); MS: m/e = 312 $(M^\oplus, 100\%)$; IR: $\bar{\nu}$ = 1731 (C=O) $cm^{-1}$. |
| IIa.54 | $(CH_2)_5CO_2H$ | $C_{21}H_{28}O_2$ (312,45); MS: m/e = 312 $(M^\oplus, 100\%)$; IR: $\bar{\nu}$ = 1699 (C=O) $cm^{-1}$. |
| IIa.55 | $(CH_2)_5CO_2CH_3$ | $C_{22}H_{30}O_2$ (326,48); MS: m/e = 326 $(M^\oplus, 60\%)$; IR: $\bar{\nu}$ = 1730 (C=O) $cm^{-1}$. |
| IIa.56 | $(CH_2)_9CO_2H$ | $C_{26}H_{40}O_2$ (384,61); MS: m/e = 384 $(M^\oplus)$; IR: $\bar{\nu}$ = 1695 (C=O) $cm^{-1}$. |
| IIa.57 | $(CH_2)_9CO_2CH_3$ | $C_{27}H_{42}O_2$ (398,63); MS: m/e = 398 $(M^\oplus)$; IR: $\bar{\nu}$ = 1733 (C=O) $cm^{-1}$. |

[1]HW: Houben-Weyl: Methoden der organ. Chemie, vol. 5; part 2c, Thieme Verlag Stuttgart, New York 1985.

B) Preparation of azulenesquaric acid dyes

EXAMPLE 13

Guaiazulene(2-(methoxycarbonyl)ethyl)squaric acid dye (Ib.38)

13.5 g (0.05 mol) of methyl guaiazulenepropionate (Example 2) and 5.8 g (0.05 mol) of squaric acid were refluxed in 600 ml of 1:1 toluene/n-butanol for 8 hours under a water separator. The solvent was then distilled off. The green oil was taken up with a little methylene chloride and purified by column chromatography (1 kg of silica gel; 9:1 methylene chloride/acetone).

Yield: 10.1 g (65%); mp.: 175°-177° C;
UV (toluene): λ max=773 nm, $\epsilon$=112100;
UV ($CH_2Cl_2$): λ max=768 nm, $\epsilon$=112700;
UV ($CH_2H_5OH$): λ max=759 nm, $\epsilon$=115300;
IR (KBr): $\nu$=2960, 2870, 1731 (C=O), 1611, 1548, 1435, 1385, 1330 s 1247, 1178, 1075, 1011, 899 $cm^{-1}$; $^1$H-NMR ($CDCl_3$): $\sigma$=1.35 d(12H), 2.55 s(6H), 2.70 t(4H), 3.12 q(2H), 3.50 s(6H), 4.27 t(4H), 7.57 d(2H), 7.62 d(2H), 8.10 s(2H), 8.89 s(2H); $^{13}$C-NMR ($CDCl_3$): $\sigma$=13.03, 24.18 (2C), 34.73, 35.28, 38.26, 51.47, 121.19, 130.85, 134.19, 134.69, 138.22, 139.77, 141.55, 147.68, 150.65, 154.33, 172.93, 181.36, 183.19; MS: m/e=618 $(M^\oplus, 2\%)$.

EXAMPLE 14

Guaiazulene(2-(Isopropoxycarbonyl)Ethyl)Squaric Acid Dye (Ib.41) Method of Preparation 1

2.5 g (8.4 mmol) of isopropylguaiazulenepropionate (IIb.41) and 1.14 g (10 mmol) of squaric acid were boiled for 8 hours in 80 ml of toluene and 80 ml of n-butanol under a water separator, the solvent was then distilled off, and the residue was chromatographed over silica gel.

Yield: 1.6 g (56.5%); mp.: 126°-127° C.;
UV ($CH_2Cl_2$): λmax=769 nm, $\epsilon$=113550;
IR: $\nu$=2958, 1724 (C=O), 1611, 1431, 1387, 1327s, 1247, 1180, 1010, 960, 898, 800 $cm^{-1}$; $^1$H-NMR ($CDCl_3$): $\delta$=1.03 d(12H), 1.38 d(12H), 2.54 s(6H), 2.65 t(4H), 3.12 q(2H), 4.29 t(4H), 4.82 q(2H), 7.57 d(d), (4H), 8.20 s(2H), 8.90 s(2H); $^{13}$C-NMR ($CDCl_3$): $\delta$=12.96, 21.69 (2C), 24.22 (2C), 34.96, 36.00, 38.37, 67.57, 121.55, 130.76, 134.00, 134.56, 138.01, 140.01, 141.83, 147.80, 150.42, 154.84, 172.02, 182.06, 183.10; Ms: m/e=674 $(M^\oplus, 15\%)$.

EXAMPLE 15

Guaiazulene(2-(Isopropoxycarbonyl)Ethyl)Squaric Acid Dye (Ib..41) Method of Preparation 2

5.13 g (0.02 mmol) of guaiazulenepropionic acid (Example 1) and 3.4 g (0.03 mmol) of squaric acid were refluxed for 12 hours in 250 ml of toluene and 250 ml of isopropanol under a water separator, the solvent was then distilled off, and the residue was chromatographed over silica gel.

According to DC, IR and $^1$H-NMR the product is identical to the product of Example 14, but has a slightly lower melting point which may be due to residues (<1%) of free carboxylic acid groups on the dye.

Yield: 2.6 g (38.5%); mp.: 120°-121° C.;
UV ($CH_2Cl_2$): λ max=769 nm, $\epsilon$=111950.

EXAMPLE 16

Bis[n-butyl 3-(7-Isopropyl-1-Methyl)Azulen-4-yl-2-Ethylpropionate]Squaric Acid Dye (Compound No. 10)

17.0 g (0.05 mol) of butyl azulene-7-isopropyl-1-methyl-4-α-ethylpropionate (Example 7) and 11.4 g (0.1 mol) of squaric acid were refluxed for 1 hour in 1,000 ml of 1:1 toluene/n-butanol. The green oil remaining on distilling off the solvent was taken up in a little methylene chloride and chromatographed over silica gel (9:1 methylene chloride/acetone) giving 10.9 g (54%) of dye No. 10 in the form of reddish brown crystals of mp. 154° C.

Physical data:

UV (CH$_2$Cl$_2$): $\lambda_{max}$=771 mm ($\epsilon$=113525);

IR (KBr): $\nu$=2959, 2928, 2870 (CH); 1728 (C=O); 1610, 1596, 1432, 1384, 1330s, 1250, 1223, 1181, 1033, 1004 cm$^{-1}$;

$^1$H-NMR (CDCl$_3$): $\delta$=0.78 m(12H), 1.06 me(4H), 1.25 mc(4H), 1.48 d(12H), 1.58 m(4H), 2.53 s(6H), 2.58 m(2H), 3.08 me (2H), 3.72 m(4H), 3.78 m(2H), 4.62 mc(2H), 7.45, 7.55 AB(4H), 8.06s (2H), 8.85 s(2H);

$^{13}$C-NMR (CDCl$_3$): $\delta$=11.89 (2C), 12.94 (2C), 13.58 (2C), 19.05 (2C), 24.22 (4C), 26.02 (2C), 30.63 (2C), 38.38 (2C), 42.43 (2C), 49.68 (2C), 63.90 (2C), 121.78 (2C), 130.49 (2C), 133.85 (2C), 134.90 (2C), 137.80 (2C), 139.74 (2C), 142.24 (2C), 147.62 (2C), 150.32 (2C), 153.93 (2C), 174.84 (2C), 181.76 (2C), 183.16 (2C);

MS: m/e=758 (100%), 759-762 (M$^{\oplus\oplus}$-Isotope peaks).

The same method was used to prepare the azulene-squaric acid dyes listed in Table 3. The structure of these dyes was confirmed by $^1$H-NMR, $^{13}$C-NMR, IR and MS spectra.

TABLE 3

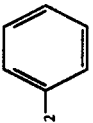

| Compound No. | $R^1$ | $R^2$ | $R^3$ | $R^4$ | $R^5$ | $\lambda_{max}$ [nm] (in $CH_2Cl_2$) | mp. [°C.] |
|---|---|---|---|---|---|---|---|
| 1 | $CH_2CO_2sC_4H_9$ | H | $CH(CH_3)_2$ | H | $CH_3$ | 767 | 108–110 |
| 2 | $CH_2CO_2CH_2$–C$_6$H$_5$ | H | $CH(CH_3)_2$ | H | $CH_3$ | 767 | [oil]* |
| 3 | $CH_2CO_2CH_2Br$ | H | $CH(CH_3)_2$ | H | $CH_3$ | 767 | 130–132 |
| 4 | $CHCO_2CH_3$ \| $CH_3$ | H | $CH(CH_3)_2$ | H | $CH_3$ | 768 | 220–221 |
| 5 | $CHCO_2nC_4H_9$ \| $CH_3$ | H | $CH(CH_3)_2$ | H | $CH_3$ | 770 | 172–173 |
| 6 | $CHCO_2CH_3$ \| $C_2H_5$ | H | $CH(CH_3)_2$ | H | $CH_3$ | 768 | 196–197 |
| 7 | $CHCO_2C_2H_5$ \| $C_2H_5$ | H | $CH(CH_3)_2$ | H | $CH_3$ | 770 | 185–187 |
| 8 | $CHCO_2nC_3H_7$ \| $C_2H_5$ | H | $CH(CH_3)_2$ | H | $CH_3$ | 773 | 194 |
| 9 | $CHCO_2iC_3H_7$ \| $C_2H_5$ | H | $CH(CH_3)_2$ | H | $CH_3$ | 771 | 180–182 |
| 10 | $CHCO_2nC_4H_9$ \| $C_2H_5$ | H | $CH(CH_3)_2$ | H | $CH_3$ | 771 (see Ex. 16) | 154 |

TABLE 3-continued
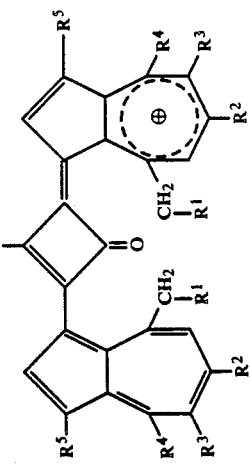
| Compound No. | R¹ | R² | R³ | R⁴ | R⁵ | λmax [nm] (in CH₂Cl₂) | mp. [°C.] |
|---|---|---|---|---|---|---|---|
| 11 | CHCO₂C₄H₉ \| C₂H₅ | H | CH(CH₃)₂ | H | CH₃ | 773 | 181 |
| 12 | CHCO₂C₂H₅ \| C₆H₅ | H | CH(CH₃)₂ | H | CH₃ | 768 | 215–217 |
| 13 | CH₂OC(O)CH₃ | H | CH(CH₃)₂ | H | CH₃ | 765 | [oil]* |
| 14 | (CH₂)₂OC(O)CH₃ | H | CH(CH₃)₂ | H | CH₃ | 765 | [oil]* |
| 15 | (CH₂)₂OC(O)C(CH₃)₃ | H | CH(CH₃)₂ | H | CH₃ | 768 | >80* |
| 16 | (CH₂)₂OC(O)C₉H₁₉ | H | CH(CH₃)₂ | H | CH₃ | 765 | [oil]* |
| 17 | CH₂OC(O)—C₆H₅ | H | CH(CH₃)₂ | H | CH₃ | 765 | [oil]* |
| 18 | (CH₂)₂OC(O)—C₆H₅ | H | CH(CH₃)₂ | H | CH₃ | 768 | 230–232 |
| 19 | (CH₂)₂OC(O)—C₆H₂(OCH₃)₂(CH₃) | H | CH(CH₃)₂ | H | CH₃ | 767 | 183–185 |

TABLE 3-continued

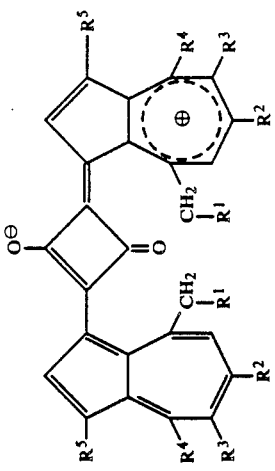

| Compound No. | $R^1$ | $R^2$ | $R^3$ | $R^4$ | $R^5$ | $\lambda_{max}$ [nm] (in $CH_2Cl_2$) | mp. [°C.] |
|---|---|---|---|---|---|---|---|
| 20 | (CH$_2$)$_2$OP(=O)(C$_6$H$_5$)$_2$ | H | CH(CH$_3$)$_2$ | H | CH$_3$ | 769 | 208–209 |
| 21 | (CH$_2$)$_2$OP(=O)(CH$_3$)C$_2$H$_5$ | H | CH(CH$_3$)$_2$ | H | CH$_3$ | 772 | [oil]* |
| 22 | CHCH$_2$OP(=O)—CH$_3$<br>\|<br>C$_2$H$_5$ ⎯ C$_2$H$_5$ | H | CH(CH$_3$)$_2$ | H | CH$_3$ | 772 | 201–202* |
| 23 | (CH$_2$)$_2$OP(=O)(CH$_3$)$_2$ | H | CH(CH$_3$)$_2$ | H | CH$_3$ | 770 | [oil]* |
| 24 | (CH$_2$)$_2$OCH$_3$ | H | CH$_3$ | H | CH$_3$ | 763 | [oil]* |
| 25 | CO$_2$C$_2$H$_5$ | CH$_3$ | H | CH$_3$ | H | 723 | 155–162* |
| 26 | CO$_2$nC$_3$H$_7$ | CH$_3$ | H | CH$_3$ | H | 721 | [oil]* |
| 27 | CO$_2$iC$_3$H$_7$ | CH$_3$ | H | CH$_3$ | H | 723 | 136–140* |
| 28 | H | CH$_3$ | H | CH$_3$ | CH(CH$_3$)$_2$ | 744 | ca. 255* |
| 29 | H | CH$_3$ | H | CH$_3$ | CH—C$_8$H$_{17}$<br>\|<br>CH$_3$ | 756 | 177–179 |
| 30 | H | CH$_3$ | H | CH$_3$ | CH—C$_{12}$H$_{25}$<br>\|<br>CH$_3$ | 757 | 145–148 |
| 31 | H | CH$_3$ | H | CH$_3$ | CH$_2$—C$_6$H$_5$ | 739 | [oil]* |

TABLE 3-continued
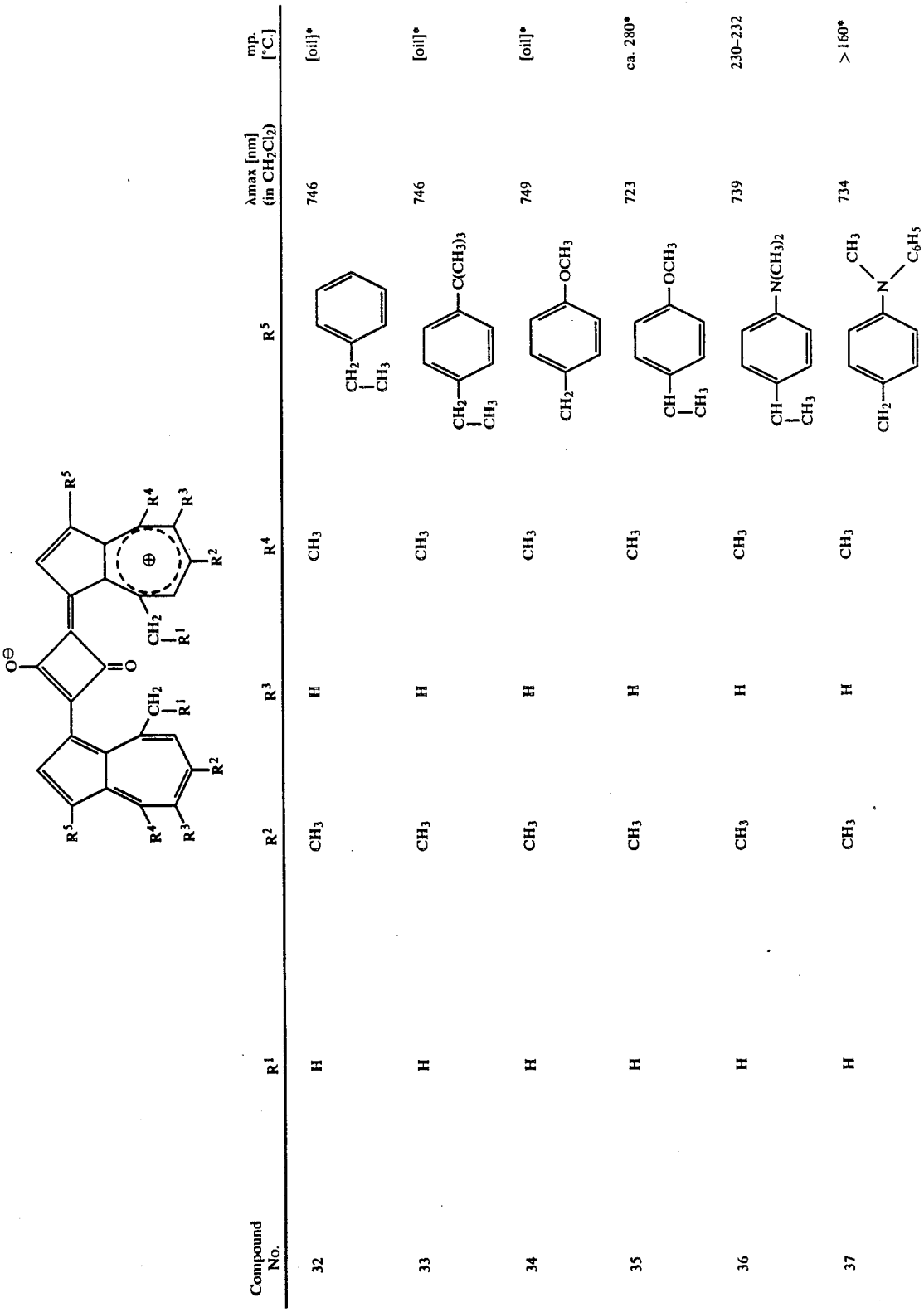
| Compound No. | R¹ | R² | R³ | R⁴ | R⁵ | λmax [nm] (in CH₂Cl₂) | mp. [°C.] |
|---|---|---|---|---|---|---|---|
| 32 | H | CH₃ | H | CH₃ | -CH₂-C₆H₅ (with CH₂CH₃) | 746 | [oil]* |
| 33 | H | CH₃ | H | CH₃ | -CH₂-C₆H₄-C(CH₃)₃ | 746 | [oil]* |
| 34 | H | CH₃ | H | CH₃ | -CH₂-C₆H₄-OCH₃ | 749 | [oil]* |
| 35 | H | CH₃ | H | CH₃ | -CH(CH₃)-C₆H₄-OCH₃ | 723 | ca. 280* |
| 36 | H | CH₃ | H | CH₃ | -CH(CH₃)-C₆H₄-N(CH₃)₂ | 739 | 230-232 |
| 37 | H | CH₃ | H | CH₃ | -CH₂-C₆H₄-N(CH₃)(C₆H₅) | 734 | >160* |

TABLE 3-continued
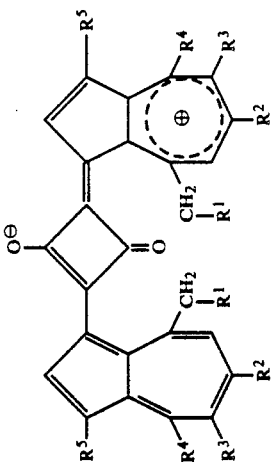
| Compound No. | R¹ | R² | R³ | R⁴ | R⁵ | λmax [nm] (in CH₂Cl₂) | mp. [°C.] |
|---|---|---|---|---|---|---|---|
| 38 | H | CH₃ | H | CH₃ | ―CH₂―C₆H₄―N(CH₃)₂ | 749 | 277–279 |
| 39 | H | CH₃ | H | CH₃ | ―CH₂―C₆H₄―F | 747 | 230–231 |
| 40 | H | ―C₆H₄―OCH₃ | H | CH₃ | H | 728 | 268 |
| 41 | H | ―C₆H₄―OCH₃ | H | ―C₆H₄―OCH₃ | H | 746 | 237 |
(*denotes that the product is either an isomeric mixture or not analytically pure)

TABLE 4

List of azulenesquaric acid dyes I

| Compound No. | $R^1$ | Comments: characterization |
|---|---|---|
| Ia.1 | H | (Reference) cf. W. Ziegenbein and H.-E. Sprenger, Angew. Chem., 78, (1966), 937; $C_{30}H_{26}O_2$ (418,54) $\lambda max = 720$ nm ($CHCl_3$), MS: m/e = 418 ($M^{\oplus}$, 100%). |
| Ia.2 | $CH_3$ | $C_{32}H_{30}O_2$ (446,59); $\lambda max = 718$ nm ($CH_2Cl_2$), MS: m/e = 446 ($M^{\oplus}$, 100%). |
| Ia.3 | $CH(CH_3)_2$ | $C_{36}H_{38}O_2$ (502,70); $\lambda max = 720$ nm ($CH_2Cl_2$), MS: m/e = 502 ($M^{\oplus}$, 100%). |
| Ia.4 | $C_4H_9$ | $C_{38}H_{42}O_2$ (530,75); $\lambda max = 715$ nm ($CH_2Cl_2$), MS: m/e = 530 ($M^{\oplus}$, 100%). |
| Ia.5 | $CH_2-C_6H_5$ | $C_{44}H_{38}O_2$ (598,79); $\lambda max = 719$ nm ($CH_2Cl_2$), MS: m/e = 598 ($M^{\oplus}$, 80%), 91 (100%). |
| Ia.6 | $CO_2H$ | $C_{32}H_{26}O_6$ (506,56); $\lambda max = 720$ nm ($CH_2Cl_2$), MS: m/e = 506 ($M^{\oplus}$, 10%). |
| Ia.7 | $CO_2CH_3$ | $C_{34}H_{30}O_6$ (534,61); $\lambda max = 720$ nm ($CH_2Cl_2$), MS: m/e = 534 ($M^{\oplus}$, 1%); IR: $\bar{\nu} = 1731$ cm$^{-1}$ (C=O). |
| Ia.8 | $CO_2C_4H_9$ | $C_{40}H_{42}O_6$ (618,77); $\lambda max = 718$ nm ($CH_2Cl_2$), MS: m/e = 618 ($M^{\oplus}$, 0,5%); IR: $\bar{\nu} = 1732$ cm$^{-1}$ (C=O). |
| Ia.9 | $CH_2CO_2H$ | $C_{34}H_{30}O_6$ (534,61); $\lambda max = 718$ nm ($CH_2Cl_2$), MS: m/e = 534 ($M^{\oplus}$); IR: $\bar{\nu} = 1698$ cm$^{-1}$ (C=O). |
| Ia.10 | $CH_2CO_2CH_3$ | $C_{36}H_{36}O_6$ (562,66); $\lambda max = 722$ nm ($CH_2Cl_2$), 713 nm ($C_2H_5OH$); MS: m/e = 562 ($M^{\oplus}$, 3%); IR: $\bar{\nu} = 1731$ (C=O), 1609, 1578, 1434, 1389, 1302s, 1209, 1162, 1104, 970, 718 cm$^{-1}$. |
| Ia.11 | $CH_2CO_2C_2H_5$ | $C_{38}H_{40}O_6$ (592,73); $\lambda max = 718$ nm ($CH_2Cl_2$), MS: m/e = 592 ($M^{\oplus}$, 4%); IR: $\bar{\nu} = 1730$ (C=O), 1300 cm$^{-1}$. |
| Ia.12 | $CH_2CO_2\text{-}n\text{-}C_3H_7$ | $C_{40}H_{44}O_6$ (620,79); $\lambda max = 720$ nm ($CH_2Cl_2$), MS: m/e = 620 ($M^{\oplus}$, 3%); IR: $\bar{\nu} = 1729$ (C=O), 1298 cm$^{-1}$. |
| Ia.13 | $CH_2CO_2\text{-}i\text{-}C_3H_7$ | $C_{40}H_{44}O_6$ (620,79); $\lambda max = 721$ nm ($CH_2Cl_2$), MS: m/e = 620 ($M^{\oplus}$, 0,5%); IR: $\bar{\nu} = 1733$ (C=O), 1303 cm$^{-1}$. |
| Ia.14 | $CH_2CO_2C_4H_9$ | $C_{42}H_{48}O_6$ (648,84); $\lambda max = 720$ nm ($CH_2Cl_2$), MS: m/e = 648 ($M^{\oplus}$, 1%); IR: $\bar{\nu} = 1730$ (C=O), 1301 cm$^{-1}$. |
| Ia.15 | $CH_2CO_2C_8H_{17}$ | $C_{50}H_{64}O_6$ (761,06); $\lambda max = 720$ nm ($CH_2Cl_2$), IR: $\bar{\nu} = 1731$ (C=O), 1302 cm$^{-1}$. |
| Ia.16 | $(CH_2)_2OH$ | |
| Ia.17 | $(CH_2)_2CO_2H$ | $C_{36}H_{34}O_6$ (562,66); $\lambda max = 716$ nm ($CH_2Cl_2$), MS: m/e = 562 ($M^{\oplus}$, 1%); IR: $\bar{\nu} = 1702$ cm$^{-1}$. |
| Ia.18 | $(CH_2)_2CO_2CH_3$ | $C_{38}H_{38}O_6$ (590,72); $\lambda max = 719$ nm ($CH_2Cl_2$), MS: m/e = 590 ($M^{\oplus}$, 2%); IR: $\bar{\nu} = 1733$ (C=O), 1301s cm$^{-1}$. |
| Ia.19 | $(CH_2)_2CO_2C_2H_5$ | $C_{40}H_{42}O_6$ (618,77); $\lambda max = 721$ nm ($CH_2Cl_2$), MS: m/e = 618 ($M^{\oplus}$, 1%); IR: $\bar{\nu} = 1730$ (C=O), 1606, 1437, 1390, 1304s, 1210, 1166, 1074, 1034, 971, 720 cm$^{-1}$. $^{13}$C-NMR ($CDCl_3$): $\delta = 14,22, 28,15, 29,00, 34,39, 35,45, 60,70, 119,76, 124,65, 134,05, 134,77, 136,18, 137,59, 140,84, 146,00, 149,68, 150,01, 153,70, 172,09, 182,68.$ |
| Ia.20 | $(CH_2)_2CO_2iC_3H_7$ | $C_{42}H_{46}O_6$ (646,83); $\lambda max = 722$ nm ($CH_2Cl_2$), IR: $\bar{\nu} = 1733$ (C=O), 1300s cm$^{-1}$. |
| Ia.21 | $(CH_2)_2CO_2C_4H_9$ | $C_{44}H_{50}O_6$ (674,88); $\lambda max = 720$ nm ($CH_2Cl_2$), IR: $\bar{\nu} = 1731$ (C=O), 1301s cm$^{-1}$. |
| Ia.22 | $(CH_2)_3OH$ | no product by Example 9 |
| Ia.23 | $(CH_2)_4CO_2H$ | $C_{40}H_{42}O_6$ (618,77); $\lambda max = 717$ nm ($CH_2Cl_2$), IR: $\bar{\nu} = 1704$ (C=O) cm$^{-1}$. |
| Ia.24 | $(CH_2)_4CO_2CH_3$ | $C_{42}H_{46}O_6$ (646,83); $\lambda max = 724$ nm ($CH_2Cl_2$), IR: $\bar{\nu} = 1733$ (C=O), 1298s cm$^{-1}$. |
| Ia.25 | $(CH_2)_5CO_2H$ | $C_{42}H_{46}O_6$ (646,83); $\lambda max = 718$ nm ($CH_2Cl_2$), IR: $\bar{\nu} = 1701$ (C=O) cm$^{-1}$. |

TABLE 4-continued

List of azulenesquaric acid dyes I

| Compound No. | $R^1$ | Comments: characterization |
|---|---|---|
| Ia.26 | $(CH_2)_5CO_2CH_3$ | $C_{44}H_{50}O_6$ (674,88); $\lambda$max = 722 nm ($CH_2Cl_2$), IR: $\bar{\nu}$ = 1730 (C=O), 1301s cm$^{-1}$. |
| Ia.27 | $(CH_2)_9CO_2H$ | $C_{50}H_{62}O_6$ (759,04); $\lambda$max = 719 nm ($CH_2Cl_2$), IR: $\bar{\nu}$ = 1698 (C=O) cm$^{-1}$. |
| Ia.28 | $(CH_2)_9CO_2CH_3$ | $C_{52}H_{66}O_6$ (787,10); $\lambda$max = 725 nm ($CH_2Cl_2$), IR: $\bar{\nu}$ = 1732 (C=O), 1302s cm$^{-1}$. |
| Ib.29 | H | (Reference) cf. W. Ziegenbein and H. -E. Sprenger, Angew. Chem., 78, (1966), 937; mp.: 256–57° C. (dec.); $\lambda$max = 767 nm, $\epsilon$ = 133500 (CHCl$_3$); $C_{34}H_{34}O_2$ (474,65); MS: m/e = 474 (M$^\oplus$, 100%), 459 (M$^\oplus$-CH$_3$), 431, 209, 43; IR(KBr): $\bar{\nu}$ = 2980, 1610, 1585, 1420, 1384s, 1328s, 1297sh, 1238, 1213, 1180, 1087, 1006, 957, 897, 873, 839, 799, 645, 585 cm$^{-1}$; $^1$H-NMR (CDCl$_3$): $\sigma$ = 1,36 d(6H), 2,51 s(3H), 3,11 g(1H), 3,38 s(3H), 7,48 d(d)(2H), 8,07 s(1H), 8,77 s(1H); $^{13}$C-NMR (CDCl$_3$): $\sigma$ = 12,92, 24,33, 28,10, 38,31, 121,85, 130,46, 133,96, 135,50, 137,70, 139,09, 142,42, 147,09, 149,92, 152,60, 182,75, 183,46. |
| Ib.30 | $CH_3$ | $C_{36}H_{38}O_2$ (502,70); $\lambda$max = 766 nm ($CH_2Cl_2$), MS: m/e = 502 (M$^\oplus$, 100%). |
| Ib.31 | $CH(CH_3)_2$ | $C_{40}H_{46}O_2$ (558,81); $\lambda$max = 769 nm ($CH_2Cl_2$), MS: m/e = 558 (M$^\oplus$, 100%), 543, 528. |
| Ib.32 | $C_4H_9$ | $C_{42}H_{50}O_2$ (586,86); $\lambda$max = 767 nm ($CH_2Cl_2$), MS: m/e = 586 (M$^\oplus$, 100%). |
| Ib.33 | $CH_2$—$C_6H_5$ | $C_{48}H_{46}O_2$ (654,90); $\lambda$max = 769 nm, ($CH_2Cl_2$); MS: m/e = 654 (M$^\oplus$, 40%), 91 ($C_7H_7^\oplus$, 100%); $^1$H-NMR (CDCl$_3$): $\sigma$ = 1,35 d(12H), 2,54 s(6H), 2,76 t(4H), 3,09 q(2H), 4,13 t(4H), 6,90 m(4H,Phenyl), 7,03 m(6H, Phenyl), 7,37 d(2H), 7,52 d(2H), 8,08 s(2H), 8,70 s(2H). |
| Ib.34 | $CO_2H$ | $C_{36}H_{34}O_6$ (562,66); $\lambda$max = 760 nm ($CH_2Cl_2$), MS: m/e = 562 (M$^\oplus$, 10%). IR: $\bar{\nu}$ = 1698 (C=O) cm$^{-1}$. |
| Ib.35 | $CO_2CH_3$ | $C_{38}H_{38}O_6$ (590,72); $\lambda$max = 767 nm ($CH_2Cl_2$), MS: m/e = 590 (M$^\oplus$, 100%); IR: $\bar{\nu}$ = 1732 (C=O) cm$^{-1}$. |
| Ib.36 | $CO_2C_4H_9$ | $C_{44}H_{50}O_6$ (674,88); $\lambda$max = 769 nm ($CH_2Cl_2$), MS: m/e = 674 (M$^\oplus$), 101, 73, 57. IR: $\bar{\nu}$ = 1732 (C=O) cm$^{-1}$. |
| Ib.37 | $CH_2CO_2H$ | $C_{38}H_{38}O_6$ (590,72); $\lambda$max = 768 nm ($CH_2Cl_2$), MS: m/e = 590 (M$^\oplus$, 4%); IR: $\bar{\nu}$ = 1701 (C=O) cm$^{-1}$. |
| Ib.38 | $CH_2CO_2CH_3$ | see Example 13 |
| Ib.39 | $CH_2CO_2C_2H_5$ | $C_{42}H_{46}O_6$ (646,83); mp.: 138–140° C. $\lambda$max = 768 nm ($CH_2Cl_2$), MS: m/e = 646 (M$^\oplus$, 100%), 631, 617, 601, 573, 500, 73, 45. $^1$H-NMR (CDCl$_3$): $\delta$ = 1,07 t(6H), 1,39 d(12H), 2,56 s(6H), 2,68 t(4H), 3,12 q(2H), 3,95 q(4H), 4,28 t(4H), 7,58 d(d) [4H], 8,10 s(2H), 8,90 s(2H); IR: $\bar{\nu}$ = 1725 (C=O), 1611, 1434, 1384, 1321s, 1248, 1181, 1074, 1009, 899, 801, 598 cm$^{-1}$. |
| Ib.40 | $CH_2CO_2$-n-$C_3H_7$ | $C_{44}H_{50}O_6$ (674,88); $\lambda$max = 768 nm ($CH_2Cl_2$), MS: m/e = 674 (M$^\oplus$, 0.8%); mp.: 141–146° C.; IR: $\bar{\nu}$ = 2962, 1724 (C=O), 1610, 1457, 1434, 1384, 1333, 1323s, 1250, 1074, 1011, 900, 804, 609 cm$^{-1}$; $^1$H-NMR (CDCl$_3$): $\delta$ = 0.76 t(6H), 1,39 d(12H), 1,43 h(4H), 2,56 s(6H), 2,69 t(4H), 3,11 q(2H), 3,86 t(4H), 4,30 t(4H), 7,58 d(d)(4H), 8,10 s(2H), 8,90 s(2H); |

TABLE 4-continued

List of azulenesquaric acid dyes I

| Compound No. | $R^1$ | Comments: characterization |
|---|---|---|
| | | $^{13}$C-NMR (CDCl$_3$): δ = 10,26, 12,97, 21,94, 24,21 (2C), 34,95, 35,63, 38,35, 65,98, 121,48, 130,79, 134,06, 134,59, 138,08, 139,99, 141,75, 147,79, 150,50, 172,60, 181,93, 183,12 |
| Ib.41 | CH$_2$CO$_2$-i-C$_3$H$_7$ | C$_{44}$H$_{50}$O$_6$ (674,88); see Examples 14 and 15 |
| Ib.42 | CH$_2$CO$_2$C$_4$H$_9$ | C$_{46}$H$_{54}$O$_6$ (702,93); λmax = 767 nm (CH$_2$Cl$_2$), 760 nm (C$_2$H$_5$OH); MS: m/e = 702 (M$^\oplus$), 312, 101, 73, 57, 55 (100%); IR: $\bar{\nu}$ = 2956, 2928, 2856, 1736 (C=O), 1609, 1461, 1386, 1339s, 1258, 1057 cm$^{-1}$. |
| Ib.43 | CH$_2$CO$_2$C$_8$H$_{17}$ | C$_{54}$H$_{70}$O$_6$ (815,15); λmax = 767 nm (CH$_2$Cl$_2$), IR: $\bar{\nu}$ = 1731 (C=O), 1330s cm$^{-1}$. |
| Ib.44 | CH$_2$CO$_2$[(CH$_2$)$_2$O]$_2$C$_2$H$_5$ | C$_{50}$H$_{62}$O$_{10}$ (823,04); λmax = 770 nm (CH$_2$Cl$_2$), IR: $\bar{\nu}$ = 1732 (C=O), 1329, 1180 cm$^{-1}$. |
| Ib.45 | (CH$_2$)$_3$OH | |
| Ib.46 | (CH$_2$)$_2$CO$_2$H | C$_{40}$H$_{42}$O$_6$ (618,77); λmax = 765 nm (CH$_2$Cl$_2$), IR: $\bar{\nu}$ = 1699 (C=O) cm$^{-1}$. |
| Ib.47 | (CH$_2$)$_2$CO$_2$CH$_3$ | C$_{42}$H$_{46}$O$_6$ (646,83); λmax = 767 nm, (CHCl$_2$), 760 nm (C$_2$H$_5$OH); MS: m/e = 646 (M$^\oplus$, 30%); IR: $\bar{\nu}$ = 2960, 1731 (C=O), 1611, 1433, 1386, 1330s, 1246, 1081, 1012, 901. 578 cm$^{-1}$; $^1$H-NMR (CDCl$_3$): σ = 1,35 d(2H), 1,94 q(4H), 2,21 t(4H), 2,55 s(6H), 3,10 q(2H), 3,55 s(6H), 3,96 t(4H), 7,55 d(d)[4H,Azul.], 8,10 s(2H,Azul.), 8,87 s(2H,Azul.); $^{13}$C-NMR (CDCl$_3$): σ = 12,95, 24,20, (2C), 27,03, 33,48, 38,33, 38,91, 51,28, 121,63, 130,81, 133,86, 134,41, 138,22, 139,92, 141,98, 147,49, 150,26, 155,79, 173,46, 181,88, 183,05. |
| Ib.48 | (CH$_2$)$_2$CO$_2$C$_2$H$_5$ | C$_{44}$H$_{50}$O$_6$ (674,88); λmax = 768 nm (CH$_2$Cl$_2$), MS: m/e = 674 (M$^\oplus$); IR: $\bar{\nu}$ = 1732 (C=O), 1330s cm$^{-1}$. |
| Ib.49 | (CH$_2$)$_2$CO$_2$iC$_2$H$_5$ | C$_{46}$H$_{54}$O$_6$ (702,93); λmax = 767 nm (CH$_2$Cl$_2$), MS: m/e = 702 (M$^\oplus$); IR: $\bar{\nu}$ = 1730 (C=O), 1330s cm$^{-1}$. |
| Ib.50 | (CH$_2$)$_2$CO$_2$C$_4$H$_9$ | C$_{48}$H$_{58}$O$_6$ (730,99); λmax = 768 nm (CH$_2$Cl$_2$), IR: $\bar{\nu}$ = 2960, 1720 (C=O), 1611s, 1433, 1388, 1336s, 1296, 1252s, 1225, 1048, 1015, 991, 907, 801, 610 cm$^{-1}$; $^1$H-NMR (CDCl$_3$): δ = 0,88 t(6H), 1,32 q(4H), 1,41 d(12H), 1,53 q(4H), 1,92 q(4H), 2,19 t(4H), 2,57 s(6H), 3,14 q(2H), 3,90 t(4H), 3,98 t(4H), 7,57 d(d), (4H), 8,12 s(2H), 8,84 s(2H); $^{13}$C-NMR (CDCl$_3$): δ = 13,05, 13,69, 19,07, 24,24 (2C), 27,03, 30,58, 33,53, 38,32, 38,76, 64,18, 121,28, 130,72, 133,86, 134,42, 138,23, 139,49, 139,55, 141,81, 147,29, 150,25, 155,60, 173,26, 180,72, 183,14. |
| Ib.52 | (CH$_2$)$_4$CO$_2$H | C$_{44}$H$_{50}$O$_6$ (674,88); λmax = 765 nm (CH$_2$Cl$_2$), IR: $\bar{\nu}$ = 1703 (C=O) cm$^{-1}$. |
| Ib.53 | (CH$_2$)$_4$CO$_2$CH$_3$ | C$_{46}$H$_{54}$O$_6$ (702,93); λmax = 768 nm (CH$_2$Cl$_2$), IR: $\bar{\nu}$ = 1733 (C=O), 1331s cm$^{-1}$. |
| Ib.54 | (CH$_2$)$_5$CO$_2$H | C$_{46}$H$_{54}$O$_6$ (702,93); λmax = 764 nm (CH$_2$Cl$_2$), IR: $\bar{\nu}$ = 1702 (C=O) cm$^{-1}$. |
| Ib.55 | (CH$_2$)$_5$CO$_2$CH$_3$ | C$_{48}$H$_{58}$O$_6$ (730,99); λmax = 767 nm (CH$_2$Cl$_2$), |

TABLE 4-continued

List of azulenesquaric acid dyes I

| Compound No. | $R^1$ | Comments: characterization |
| --- | --- | --- |
| Ib.56 | $(CH_2)_9CO_2H$ | IR: $\bar{\nu} = 1732$ (C=O), 1330s cm$^{-1}$.<br>$C_{54}H_{70}O_6$ (815,15);<br>$\lambda$max = 766 nm (CH$_2$Cl$_2$),<br>IR: $\bar{\nu} = 1705$ (C=O) cm$^{-1}$. |
| Ib.57 | $(CH_2)_9CO_2CH_3$ | $C_{56}H_{74}O_6$ (843,20);<br>$\lambda$max = 770 nm (CH$_2$Cl$_2$),<br>IR: $\bar{\nu} = 1731$ (C=O), 1331s cm$^{-1}$. |

C) Production of optical recording media

EXAMPLE 17

A 5% strength by weight solution of dye Ib.42 in toluene was applied with a syringe to a rotating polymethyl methacrylate disk at about 2,000 rpm, and the residual solvent was then spun off at 5,000 rpm. The result obtained was homogeneous, highly reflective dye layer which was excellently writable with a semiconductor laser ($\lambda = 830$ nm). The data can be read back with good contrast.

EXAMPLE 18

A 3% strength by weight solution of dye Ib.41 containing 30% by weight, based on the solids content of the solution, of polymethyl methacrylate was spincoated by the method of Example 17 onto a grooved polycarbonate disk. The result obtained was a homogeneous, highly reflective dye layer which was firmly adherent to the substrate, gave a good image of the tracking grooves on the substrate and was excellently writable with a semiconductor laser ($\lambda = 830$ nm). The written information was stable in the conditioning test and can be read back as often as desired.

EXAMPLE 19

A 2% strength by weight solution of dye Ib.38 containing, based on the solids content of the solution, 30% by weight of polymethyl methacrylate as a binder and 5% by weight of 4-octyl-4'-fluorobiphenyldithiolenenickel as a stabilizer was spincoated onto a grooved polycarbonate disk as described in Example 17. The storage layer obtained was similar to that of Example 11 in all respects but had an increased stability to UV light.

EXAMPLE 20

A 2% strength by weight solution of dye Ib.10 in 1:1 propanol/diacetone alcohol containing, based on the solids content of the solution, 30% by weight of polymethyl methacrylate and 5% by weight of biscampheratodithiolenenickel was spincoated onto a glass disk as described in Example 17. The dye layer obtained was homogeneous and showed high background reflectivity. It was readily writable with a semiconductor laser ($\lambda = 780$ nm). The written data were stable under the customary test conditions and can be read back as often as desired.

EXAMPLE 21

A 5% strength by weight solution of dye 10 in toluene was applied with a syringe to a rotating polymethyl methacrylate disk at about 2,000 rpm, and the remaining solvent was then spun off at 5,000 rpm. The result obtained was a homogeneous, highly reflective dye layer which was excellently writable with a semiconductor laser ($\lambda = 830$ nm). The data can be read back with good contrast.

EXAMPLE 22

A 3% strength by weight solution of dye 10 in propanol/diacetone alcohol, containing 30% by weight, based on the solids content of the solution, of MMA/MAS copolymer was spuncoated onto a grooved polycarbonate disk as described in Example 17. The result obtained was a homogeneous, highly reflective dye layer which was firmly adherent to the substrate, gave a good image of the tracking grooves on the substrate and was excellently writable with a semiconductor laser ($\lambda = 830$ nm). The written information was stable in the conditioning test and can be read back as often as desired with good contrast.

EXAMPLE 23

A 2% strength by weight solution of dye 10 containing, based on the solids content of the solution, 30% by weight of polymethyl methacrylate as a binder and 5% by weight of 4-octyl-4'-fluorobiphenyldithiolenenickel as a stabilizer was spuncoated onto a grooved polycarbonate disk as described in Example 17. The storage layer obtained was similar to that of Example 17 in all respects but had an increased stability to UV light.

EXAMPLE 24

A 2% strength by weight solution of Dye 22 in a 1:1 propanol/diacetone alcohol containing, based on the solids content of the solution, 30% by weight of polymethyl methacrylate and 5% by weight of biscampheratodithiolenenickel was spuncoated onto a glass disk as described in Example 17. The dye layer obtained was homogeneous and had a high background reflectivity. It was readily writable with a semiconductor laser ($\lambda = 780$ nm). The written data were stable under the customary test conditions and can be read back as often as desired.

We claim:

1. An azulenesquaric acid dye of the formula I

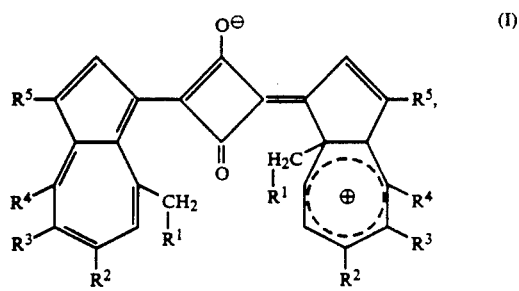

where $R^1$ is carboxyl, $C_1$–$C_{12}$-alkoxycarbonyl, $C_1$–$C_{12}$-alkoxycarbonyl where the alkyl chain is interrupted by one or more oxygen atoms, carbamoyl, $C_1$–$C_4$-monoalkyl- or -dialkylcarbamoyl or $C_1$–$C_{12}$-alkyl, which is substituted by halogen, amino, hydroxyl, $C_1$–$C_{12}$-alkoxy, phenyl, phenyl substituted by $C_1$–$C_4$-alkyl, $C_1$–$C_4$-alkoxy, $C_1$–$C_4$-dialkylamino, N-phenyl-N-($C_1$–$C_4$-alkyl)amino or halogen, carboxyl, $C_1$–$C_{12}$-alkoxycarbonyl, $C_1$–$C_{12}$-haloalkoxycarbonyl, $C_1$–$C_{12}$-phenylalkoxycarbonyl, cyano, $C_1$–$C_{12}$-alkanoyloxy, benzoyloxy, benzoyloxy substituted by dimethoxymethyl, and/or by the radial

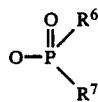

where $R^6$ and $R^7$ are identical or different and each is $C_1$–$C_4$-alkyl or phenyl independently of the other, and $R^2$, $R^3$, $R^4$ and $R^5$ are identical or different and each is hydrogen or $C_1$–$C_{12}$-alkyl, $C_1$–$C_{12}$-alkyl substituted by halogen, amino, $C_1$–$C_{12}$-alkoxy, phenyl, phenyl substituted by $C_1$–$C_4$-alkyl, $C_1$–$C_4$-alkoxy, $C_1$–$C_4$-dialkylamino, N-phenyl-N-($C_1$–$C_4$-alkyl)amino or halogen, carboxyl, $C_1$–$C_{12}$-alkoxycarbonyl or cyano, independently of the others, with the proviso that, when $R^5$ is hydrogen, the positions of substituents $CH_2$-$R^1$ and $R^4$ on either or both azulene rings may also be interchanged within an azulene ring.

2. An azulenesquaric acid dye as claimed in claim 1, wherein $R^2$, $R^3$, $R^4$ and $R^5$ are each $C_1$–$C_6$-alkyl.

3. An azulenesquaric acid dye as claimed in claim 1, wherein $R^2$ and $R^4$ are each methyl and $R^3$ and $R^5$ are each hydrogen.

4. An azulenesquaric acid dye as claimed in claim 1, wherein $R^2$ and $R^4$ are each hydrogen, $R^3$ is isopropyl and $R^5$ is methyl.

* * * * *